United States Patent
Reed et al.

(10) Patent No.: US 12,455,296 B2
(45) Date of Patent: Oct. 28, 2025

(54) SYSTEM, METHOD, COMPUTER-ACCESSIBLE MEDIUM AND APPARATUS FOR DNA MAPPING

(71) Applicants: VIRGINIA COMMONWEALTH UNIVERSITY, Richmond, VA (US); NEW YORK UNIVERSITY, New York, NY (US); UNIVERSITY OF BRISTOL, Bristol (GB)

(72) Inventors: Jason Reed, Midlothian, VA (US); Andrey Mikheykin, Richmond, VA (US); Loren Picco, Bristol (GB); Oliver Payton, Bristol (GB); Freddie Russell-Pavier, Bristol (GB)

(73) Assignees: Virginia Commonwealth UniversityNCE:, Richmond, VA (US); University of Bristol, Bristol (GB)

(*) Notice: Subject to any disclaimer, the term of this patent is extended or adjusted under 35 U.S.C. 154(b) by 153 days.

(21) Appl. No.: 18/446,093

(22) Filed: Aug. 8, 2023

(65) Prior Publication Data
US 2024/0077516 A1  Mar. 7, 2024

Related U.S. Application Data

(63) Continuation of application No. 16/475,704, filed as application No. PCT/US2018/012449 on Jan. 5, 2018, now abandoned.

(60) Provisional application No. 62/442,672, filed on Jan. 5, 2017, provisional application No. 62/443,325, filed on Jan. 6, 2017.

(51) Int. Cl.
*G01Q 20/02*  (2010.01)
*C12N 9/22*  (2006.01)
*C12N 15/11*  (2006.01)
*C12Q 1/683*  (2018.01)
*G01Q 60/42*  (2010.01)

(52) U.S. Cl.
CPC ............. *G01Q 20/02* (2013.01); *C12N 9/22* (2013.01); *C12N 15/11* (2013.01); *C12Q 1/683* (2013.01); *G01Q 60/42* (2013.01); *C12N 2310/20* (2017.05); *C12N 2800/80* (2013.01); *C12Q 2565/601* (2013.01)

(58) Field of Classification Search
CPC ............. C12Q 2565/601; C12Q 1/683; C12Q 2521/301; C12Q 2521/543; C12N 2310/20
See application file for complete search history.

(56) References Cited

FOREIGN PATENT DOCUMENTS

WO   WO-2018129226 A1 * 7/2018 ............. C12N 15/11

OTHER PUBLICATIONS

Ando et al. Biophysical Reviews. 2018. 10:285-292. (Year: 2018).*
Russell-Pavier et al. Meas. Sci. Technol. 2018. 29:105902, 9 pages. (Year: 2018).*
Mikheikin et al. Nature Communications. 2017. 8:1665, 9 pages. (Year: 2017).*
Reed et al. Nanotechnology. 2007. 18(4): 44032, 28 pages. (Year: 2007).*
Koebly et al. Cancer Genetics. 2021. 252-253:S1-S19, Abstract 29. (Year: 2021).*

* cited by examiner

*Primary Examiner* — Joseph G. Dauner
(74) *Attorney, Agent, or Firm* — WCF IP

(57) ABSTRACT

Exemplary embodiments of the present disclosure can include, for example, an atomic force microscopy (AFM) system, including a cantilever(s), an optical pickup unit(s) (OPU(s)) including a laser positioned over the cantilever(s), and a power source providing noise with a noise level that is below 300 Picometers. The noise level of the power source can be below 200 Picometers. A digitizing arrangement can be included which can be associated with the OPU. The digitizing arrangement(s) can have a bandwidth of about 2 MHZ. The OPU(s) can have a detection bandwidth of at least 80 MHZ. The exemplary apparatus can be combined with a chemical protocol and statistical signal processing and image analysis procedures to map DNA at high speed and accuracy.

26 Claims, 26 Drawing Sheets
Specification includes a Sequence Listing.

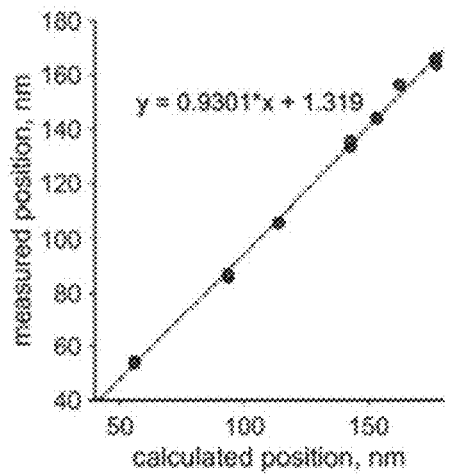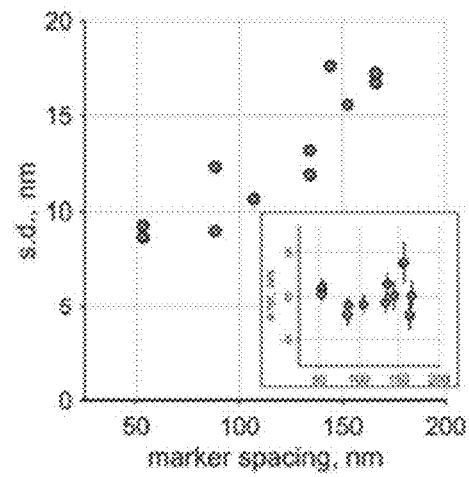
FIG. 18A  FIG. 18B
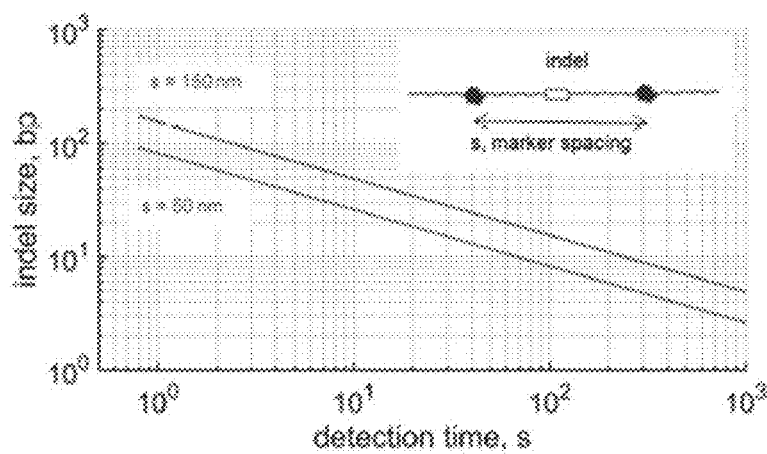
FIG. 18C

SEQUENCE LISTING

```
Sequence total quantity: 30
SEQ ID NO: 1            moltype = DNA  length = 20
FEATURE                 Location/Qualifiers
misc_feature            1..20
                        note = Synthetic primer
source                  1..20
                        mol_type = other DNA
```

```
                        organism = synthetic construct
SEQUENCE: 1
aggtcggaac gagggtcacg                                                     20

SEQ ID NO: 2            moltype = DNA   length = 20
FEATURE                 Location/Qualifiers
misc_feature            1..20
                        note = Synthetic primer
source                  1..20
                        mol_type = other DNA
                        organism = synthetic construct
SEQUENCE: 2
tgtcctcacg ctctcgggtg                                                     20

SEQ ID NO: 3            moltype = DNA   length = 20
FEATURE                 Location/Qualifiers
misc_feature            1..20
                        note = Synthetic primer
source                  1..20
                        mol_type = other DNA
                        organism = synthetic construct
SEQUENCE: 3
ggccagagga cgagtgtggt                                                     20

SEQ ID NO: 4            moltype = DNA   length = 20
FEATURE                 Location/Qualifiers
misc_feature            1..20
                        note = Synthetic primer
source                  1..20
                        mol_type = other DNA
                        organism = synthetic construct
SEQUENCE: 4
ctcagggtgg cacggcaaac                                                     20

SEQ ID NO: 5            moltype = DNA   length = 21
FEATURE                 Location/Qualifiers
misc_feature            1..21
                        note = Synthetic primer
source                  1..21
                        mol_type = other DNA
                        organism = synthetic construct
SEQUENCE: 5
accccaacat tgattccttt c                                                   21

SEQ ID NO: 6            moltype = DNA   length = 21
FEATURE                 Location/Qualifiers
misc_feature            1..21
                        note = Synthetic primer
source                  1..21
                        mol_type = other DNA
                        organism = synthetic construct
SEQUENCE: 6
cacagggaga aagtctgcaa g                                                   21

SEQ ID NO: 7            moltype = DNA   length = 18
FEATURE                 Location/Qualifiers
misc_feature            1..18
                        note = Synthetic primer
source                  1..18
                        mol_type = other DNA
                        organism = synthetic construct
SEQUENCE: 7
gtgatccacc tgcctcgg                                                       18

SEQ ID NO: 8            moltype = DNA   length = 66
FEATURE                 Location/Qualifiers
misc_feature            1..66
                        note = Synthetic probe
source                  1..66
                        mol_type = other DNA
                        organism = synthetic construct
SEQUENCE: 8
gtgatccacc tgcctcggtg taatcccagc actttgggag gaacaaatca tcaagaaatg         60
atgggc                                                                    66

SEQ ID NO: 9            moltype = DNA   length = 58
FEATURE                 Location/Qualifiers
misc_feature            1..58
                        note = Synthetic probe
```

```
source                      1..58
                            mol_type = other DNA
                            organism = synthetic construct
SEQUENCE: 9
gtgatccacc tgcctcggtg taatcccagc actttgggag gtgactgccc cagcatac      58

SEQ ID NO: 10               moltype = DNA   length = 67
FEATURE                     Location/Qualifiers
misc_feature                1..67
                            note = Synthetic probe
source                      1..67
                            mol_type = other DNA
                            organism = synthetic construct
SEQUENCE: 10
gtgatccacc tgcctcggtg taatcccagc actttgggag gacttttttcc ctctaactct   60
ttttccc                                                               67

SEQ ID NO: 11               moltype = DNA   length = 67
FEATURE                     Location/Qualifiers
misc_feature                1..67
                            note = Synthetic probe
source                      1..67
                            mol_type = other DNA
                            organism = synthetic construct
SEQUENCE: 11
gtgatccacc tgcctcggtg taatcccagc actttgggag ggggatgggt aaggatttga   60
gaactgc                                                               67

SEQ ID NO: 12               moltype = DNA   length = 67
FEATURE                     Location/Qualifiers
misc_feature                1..67
                            note = Synthetic probe
source                      1..67
                            mol_type = other DNA
                            organism = synthetic construct
SEQUENCE: 12
gtgatccacc tgcctcggtg taatcccagc actttgggag gtcagaagtc ttctctgccc   60
acatacc                                                               67

SEQ ID NO: 13               moltype = DNA   length = 61
FEATURE                     Location/Qualifiers
misc_feature                1..61
                            note = Synthetic probe
source                      1..61
                            mol_type = other DNA
                            organism = synthetic construct
SEQUENCE: 13
gtgatccacc tgcctcggtg taatcccagc actttgggag ggtgagcaag actggcacct   60
g                                                                     61

SEQ ID NO: 14               moltype = RNA   length = 23
FEATURE                     Location/Qualifiers
modified_base               2
                            mod_base = OTHER
                            note = thymine
modified_base               21
                            mod_base = OTHER
                            note = thymine
misc_feature                1..23
                            note = Synthetic sgRNA
source                      1..23
                            mol_type = other RNA
                            organism = synthetic construct
SEQUENCE: 14
gtatccctgg agcttcggtc tgg                                             23

SEQ ID NO: 15               moltype = RNA   length = 23
FEATURE                     Location/Qualifiers
misc_feature                1..23
                            note = Synthetic sgRNA
source                      1..23
                            mol_type = other RNA
                            organism = synthetic construct
SEQUENCE: 15
cacactcctc ccagagcggc cgg                                             23

SEQ ID NO: 16               moltype = RNA   length = 23
FEATURE                     Location/Qualifiers
misc_feature                1..23
```

```
                        note = Synthetic sgRNA
source                  1..23
                        mol_type = other RNA
                        organism = synthetic construct
SEQUENCE: 16
gctagagaag ccatgccaag agg                                              23

SEQ ID NO: 17           moltype = RNA   length = 23
FEATURE                 Location/Qualifiers
misc_feature            1..23
                        note = Synthetic sgRNA
source                  1..23
                        mol_type = other RNA
                        organism = synthetic construct
SEQUENCE: 17
tccctggttc acttggacct ggg                                              23

SEQ ID NO: 18           moltype = RNA   length = 23
FEATURE                 Location/Qualifiers
misc_feature            1..23
                        note = Synthetic sgRNA
source                  1..23
                        mol_type = other RNA
                        organism = synthetic construct
SEQUENCE: 18
tcaactgcag ccagttcctt cgg                                              23

SEQ ID NO: 19           moltype = RNA   length = 23
FEATURE                 Location/Qualifiers
misc_feature            1..23
                        note = Synthetic sgRNA
source                  1..23
                        mol_type = other RNA
                        organism = synthetic construct
SEQUENCE: 19
cgagtactgc aggggtatga ggg                                              23

SEQ ID NO: 20           moltype = RNA   length = 23
FEATURE                 Location/Qualifiers
misc_feature            1..23
                        note = Synthetic sgRNA
source                  1..23
                        mol_type = other RNA
                        organism = synthetic construct
SEQUENCE: 20
tgtaatccca gcactttggg agg                                              23

SEQ ID NO: 21           moltype = DNA   length = 23
FEATURE                 Location/Qualifiers
misc_feature            1..23
                        note = Synthetic target
source                  1..23
                        mol_type = other DNA
                        organism = synthetic construct
SEQUENCE: 21
cctcctaaag tgctgggatt aca                                              23

SEQ ID NO: 22           moltype = DNA   length = 23
FEATURE                 Location/Qualifiers
misc_feature            1..23
                        note = Synthetic target
source                  1..23
                        mol_type = other DNA
                        organism = synthetic construct
SEQUENCE: 22
cctcccaaag tgctaggatt aca                                              23

SEQ ID NO: 23           moltype = DNA   length = 23
FEATURE                 Location/Qualifiers
misc_feature            1..23
                        note = Synthetic target
source                  1..23
                        mol_type = other DNA
                        organism = synthetic construct
SEQUENCE: 23
cctcccaaag tgctgggatt aca                                              23

SEQ ID NO: 24           moltype = DNA   length = 23
FEATURE                 Location/Qualifiers
```

```
misc_feature           1..23
                       note = Synthetic target
source                 1..23
                       mol_type = other DNA
                       organism = synthetic construct
SEQUENCE: 24
ccttccaaag tgctgggatt aca                                              23

SEQ ID NO: 25          moltype = DNA  length = 23
FEATURE                Location/Qualifiers
misc_feature           1..23
                       note = Synthetic target
source                 1..23
                       mol_type = other DNA
                       organism = synthetic construct
SEQUENCE: 25
cctcccaaag tgctaggatt aca                                              23

SEQ ID NO: 26          moltype = DNA  length = 23
FEATURE                Location/Qualifiers
misc_feature           1..23
                       note = Synthetic target
source                 1..23
                       mol_type = other DNA
                       organism = synthetic construct
SEQUENCE: 26
cctcccaaag tgctgggatt aca                                              23

SEQ ID NO: 27          moltype = DNA  length = 23
FEATURE                Location/Qualifiers
misc_feature           1..23
                       note = Synthetic target
source                 1..23
                       mol_type = other DNA
                       organism = synthetic construct
SEQUENCE: 27
cctcccaaag tgctgggatt aca                                              23

SEQ ID NO: 28          moltype = DNA  length = 23
FEATURE                Location/Qualifiers
misc_feature           1..23
                       note = Synthetic target
source                 1..23
                       mol_type = other DNA
                       organism = synthetic construct
SEQUENCE: 28
cctcccaaag tgctggaatt ata                                              23

SEQ ID NO: 29          moltype = DNA  length = 23
FEATURE                Location/Qualifiers
misc_feature           1..23
                       note = Synthetic target
source                 1..23
                       mol_type = other DNA
                       organism = synthetic construct
SEQUENCE: 29
cctcccaaag tgctgggatt aca                                              23

SEQ ID NO: 30          moltype = DNA  length = 23
FEATURE                Location/Qualifiers
misc_feature           1..23
                       note = Synthetic target
source                 1..23
                       mol_type = other DNA
                       organism = synthetic construct
SEQUENCE: 30
cctcccaaag tgctgggatt aca                                              23
```

SYSTEM, METHOD, COMPUTER-ACCESSIBLE MEDIUM AND APPARATUS FOR DNA MAPPING

CROSS-REFERENCE TO RELATED APPLICATIONS

This application is continuation of 371 application 16/475,704 filed Jul. 3, 2019, which is a national stage application from PCT/US2018/012449 filed Jan. 5, 2018 which claims benefit of U.S. provisional patent application 62/442,672, filed Jan. 5, 2017 and U.S. provisional patent application 62/443,325 filed Jan. 6, 2017, the complete contents of which is hereby incorporated by reference.

SEQUENCE LISTING

This document incorporates by reference an electronic sequence listing text file, which was electronically submitted along with this document. The text file is named 02941169US2_seqlisting.XML, is 4,227 bytes, and was created on Aug. 8, 2023.

FIELD OF THE DISCLOSURE

The present disclosure relates generally to deoxyribonucleic acid ("DNA") mapping, and more specifically, to exemplary embodiments of an exemplary system, method, computer-accessible medium and apparatus for DNA mapping.

BACKGROUND INFORMATION

Progress in whole genome sequencing using short read technologies (e.g., less than 150 base pairs ("bp")) has reinvigorated interest in high resolution physical mapping to fill technical gaps not well addressed by sequencing. For example, combining short range sequencing with long range maps to produce haplotypically correct whole genome sequences, and to provide an easy method to detect structural variants larger than the size of the sequence reads. Such a procedure can better elucidate fundamental biology involved in structural genomic changes in tumorigenesis (e.g. translocation), uncharacterized polymorphisms in a population, null models for stratified populations utilized to regularize genome wide association studies and modeling evolutionary processes such as recombination, gene conversion and duplication. State of the art physical mapping approaches involve using low-quality long reads (e.g., Pacbio, Oxford Nanopore), dilution mapping (e.g., Moleculo, 10×), mutational mapping (e.g., Museq), single molecule optical restriction mapping (e.g., Opgen, Bionano), or ultra-high coverage sequencing. Despite recent progress, these technologies remain expensive, incomplete, computationally intense, or all of the above.

Long range genetic variations such as deletion, duplications, inversions and translocations can play a significant role in complex diseases such as cancer (see, e.g., References 1-5). Current, high-throughput, genomic procedures, such as short-read next-generation sequencing, work best to study variations in relatively short sequences (e.g., several hundred base pairs) and phased sequencing utilizes various complicated approaches; repetitive sequences, haplotypic ambiguities, as well as amplification-induced bias, are existing hurdles for next generation sequencing ("NGS") analysis. In contrast, traditional optical mapping can only resolve variations larger than several thousand base pairs (see, e.g., References 6 and 7). Nano-channel augmented (see, e.g., Reference 8) and super-resolution optical mapping (see, e.g., References 9 and 10) are more precise (e.g., down to +/−100 bp), but the experimental protocols to achieve this are still lengthy and complex, and utilize sophisticated Bayesian procedures involving multiple hyper-parameters (see, e.g., Reference 11).

Thus, it may be beneficial to provide an exemplary system, method, computer-accessible medium and apparatus for DNA mapping which can overcome at least some of the deficiencies described herein above.

SUMMARY OF EXEMPLARY EMBODIMENTS

Exemplary embodiments of the present disclosure can include, for example, an atomic force microscopy (AFM) system, including a cantilever(s), a scanning probe arrangement(s) including a laser positioned over a portion of the cantilever(s) which contacts a surface of a sample(s), wherein a tilt angle of the at least one cantilever with respect to the at least one scanning probe arrangement is less than 10 degrees, and a power source, wherein the AFM system is configured to generate a displacement noise that is less than 300 Picometers. The noise level of the power source can be below 200 Picometers. A digitizing arrangement can be included which can be associated with the scanning probe arrangement(s). The digitizing arrangement(s) can have a bandwidth of about 2 MHZ. The scanning probe arrangement(s) can have a detection bandwidth of at least 80 MHZ.

In some exemplary embodiments of the present disclosure, a transparent sample plate positioned below the cantilever(s) can be included. A light emitting arrangement positioned under the sample plate can be included which can be configured to emit a light through the sample plate. The light emitting arrangement(s) can include a light(s) and a mirror(s). The cantilever(s) can have a spring constant of less than about 0.03 newton meters.

In certain exemplary embodiments of the present disclosure, a camera(s) positioned above the scanning probe arrangement(s) can be included. The laser can be positioned directly above the cantilever(s). The scanning probe arrangement(s) can include a plurality of scanning probe arrangements, the cantilever(s) can include a plurality of cantilevers and each of the scanning probe arrangements can be positioned above a corresponding one of the cantilevers. A computer hardware arrangement configured to adjust a position of the laser relative to the cantilever(s) can be included.

A further exemplary embodiment of the present disclosure for generating information regarding a portion(s) of a deoxyribonucleic acid (DNA) sample(s) can be provided, which can include, for example, receiving data related to a plurality of markers on the portion(s) of the DNA sample(s), determining a distance between at least two markers of the plurality of markers, and generating the information regarding the portion(s) of the DNA sample(s) based on the distance. The information can be (i) a map of the portion(s) of the DNA sample(s), or (ii) a species count of the portion(s) of the DNA sample(s).

In certain exemplary embodiments of the present disclosure, the information can be generated using a contour length of the portion(s) of the DNA sample(s) when the distance is above a particular distance, which can be about 125-175 base pairs, or about 140-160 base pairs, or about 150 base pairs. The information can be generated using a distribution of lengths of DNA molecules of a homogeneous population when the distance is between a first distance and a second distance, where the first distance can be about 350-450 base pairs, about 375-425 base pairs, or about 400 base pairs and the second distance can be about 50-100 base pairs, about 70-80 base pairs, or about 75 base pairs. The information can be generated by summarizing a distribution of lengths of DNA molecules as a median or a mode of the distribution of lengths when the distance is below a particular distance, which can be about 350-450 base pairs, about 375-425 base pairs, or about 400 base pairs.

A further exemplary embodiment of the present disclosure for mapping nucleotide molecules, can include, for example, (i) incubating a target nucleotide in a magnesium-free mixture, where the mixture can include a Clustered Regularly Interspaced Short Palindromic Repeats (CRISPR)-cellular apoptosis susceptibility (Cas) protein and a guide RNA, and where incubating the target nucleotide with the CRISPR-Cas protein can bind the CRISPR-Cas protein to the target nucleotide to form a CRISPR-Cas/target nucleotide complex without the CRISPR-Cas protein cleaving the target nucleotide, (ii) depositing the CRISPR-Cas/target nucleotide complex on a flat surface, where after the depositing the CRISPR-Cas/target nucleotide complex can be bound to the flat surface and (iii) imaging the CRISPR-Cas/target nucleotide complex on the flat surface by using a scanning probe-labelling technique, where prior to imaging, substantially all unbound CRISPR-Cas protein or guide RNA can be removed.

In certain exemplary embodiments of the present disclosure, the target nucleotide is deoxyribonucleic acid (DNA). The target nucleotide can also be a DNA/RNA hybrid. The DNA can be a PCR amplicon. The DNA can be genomic DNA obtained from a biological sample.

A biological sample may be of any biological tissue or fluid. Such samples include, but are not limited to, bodily fluids which may or may not contain cells, e.g., blood (e.g., whole blood, serum or plasma), urine, synovial fluid, saliva, and joint fluid; or tissue or fine needle biopsy samples, such as from bone or cartilage.

In some exemplary embodiments, the systems and methods described herein are performed on DNA, e.g. genomic DNA, with sizes ranging from tens to hundreds of thousands of base pairs. In other embodiments, smaller strands of DNA are analyzed, for example, under 300 bp in length, or under 250 bp or under 200 bp in length. The magnesium-free mixture can include EDTA, where the EDTA can chelate any magnesium in the mixture to render the mixture magnesium-free. The magnesium-free mixture can be a magnesium-free deposition buffer that can include magnesium-alternates, which can be zinc, nickel, polyamine or 3-aminopropylsilatrane. The CRISPR-Cas protein can be Cas9 or a modified Cas9. The guide RNA can be an sgRNA (single guide RNA), where the sgRNA can be designed to target a specific target nucleotide sequence marker.

In some exemplary embodiments of the present disclosure, before depositing the CRISPR-Cas/target nucleotide complex on a flat surface, any unbound CRISPR-Cas protein or guide RNA can be removed. After depositing the CRISPR-Cas/target nucleotide complex on a flat surface, any unbound CRISPR-Cas protein or guide RNA can be removed. The flat surface can be a mica surface. The flat surface can be a transparent surface. The scanning probe-labelling technique can be atomic force microscopy. The atomic force microscopy can include an atomic force microscopy (AFM) system which can include a cantilever(s), an optical pickup unit(s) (OPU) including a laser having a laser positioned over the cantilever(s), and a power source, where the AFM system can be configured to generate a displacement noise that is less than 300 Picometers.

In certain exemplary embodiments of the present disclosure, after imaging the CRISPR-Cas/target nucleotide complex on the flat surface, the image can be used for de novo mapping of the target nucleotide. After imaging the CRISPR-Cas/target nucleotide complex on the flat surface, the image can be used for quantitating the amount of the target nucleotide. After incubating, the CRISPR-Cas protein can be fixed to the target nucleotide by adding formaldehyde to the mixture.

A further exemplary embodiment of the present disclosure for mapping nucleotide molecules, can be provided, which can include, for example, (i) incubating a deoxyribonucleic acid (DNA) molecule in a magnesium-free mixture, where the mixture can include a CRISPR-Cas9 protein and an sgRNA, and further where incubating the DNA molecule with the CRISPR-Cas9 protein can bind the CRISPR-Cas9 protein to the DNA molecule to form a CRISPR-Cas9/DNA complex without the CRISPR-Cas9 protein cleaving the DNA molecule, (ii) fixing the CRISPR-Cas9/DNA complex, where formaldehyde can be added to the mixture;

depositing the CRISPR-Cas9/DNA complex on a mica surface, where after the depositing the CRISPR-Cas9/DNA complex can be bound to the mica surface, and (iii) imaging the CRISPR-Cas9/DNA complex on the mica surface by using atomic force microscopy, where before imaging any unbound CRISPR-Cas9 protein or sgRNA can be removed.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which:

FIGS. 18A, 18B, and 18C are a set of graphs illustrating sizing and precision and accuracy of the exemplary system, method, computer accessible medium and apparatus according to an exemplary embodiment of the present disclosure;

Figure 1A:
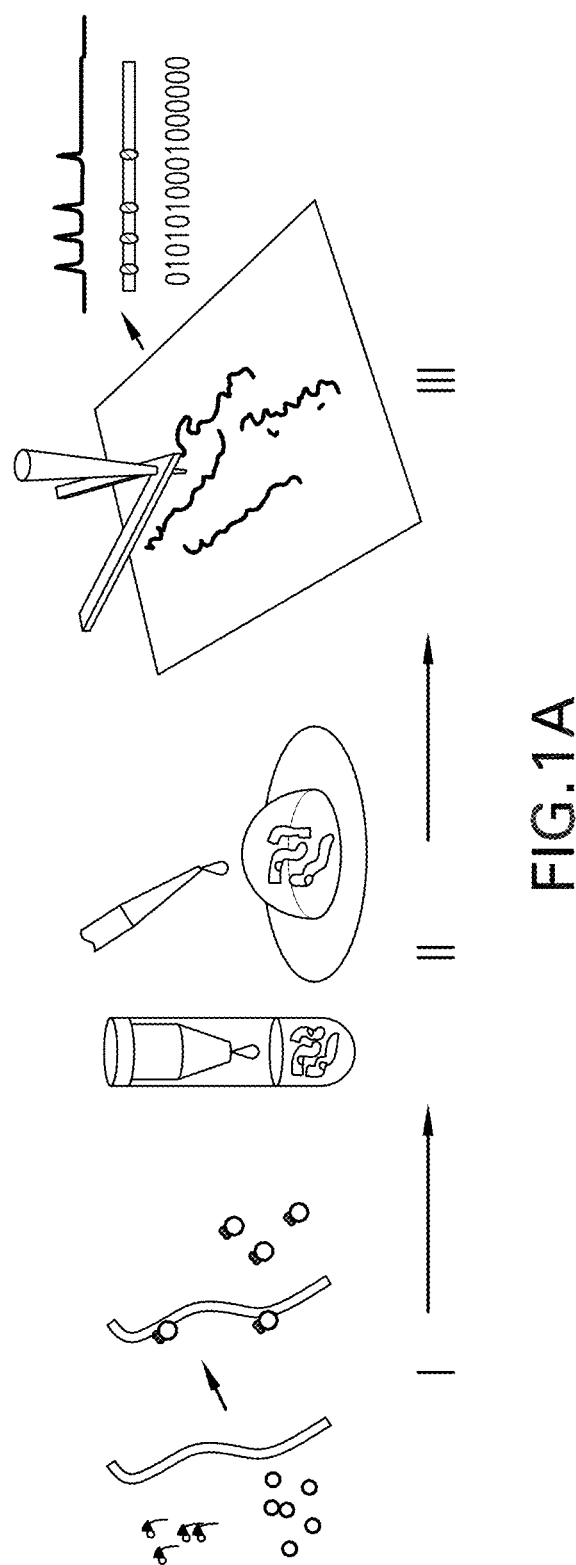
FIG. 1A is an exemplary diagram of a work flow of Cas9 labelling chemistry and sample preparation according to an exemplary embodiment of the present disclosure.

Throughout the drawings, the same reference numerals and characters, unless otherwise stated, are used to denote like features, elements, components or portions of the illustrated embodiments. Moreover, while the present disclosure will now be described in detail with reference to the Figures, it is done so in connection with the illustrative embodiments and is not limited by the particular embodiments illustrated in the Figures and the appended paragraphs.

DETAILED DESCRIPTION OF EXEMPLARY EMBODIMENTS

Figure 1B:
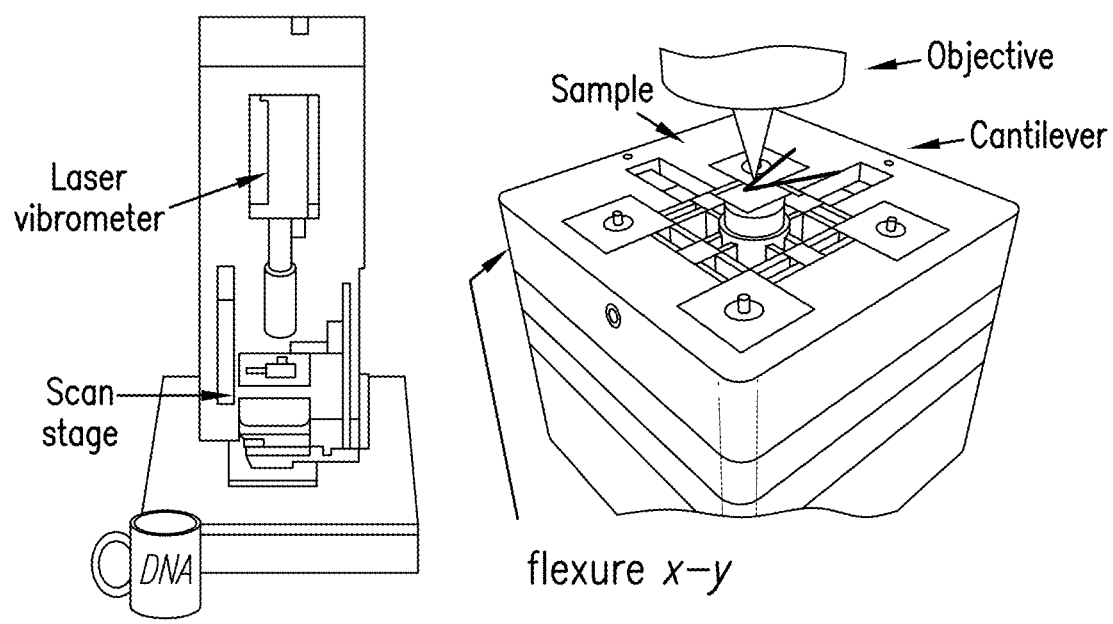
FIG. 1B is an exemplary diagram of high-speed contact mode atomic force microscopy according to an exemplary embodiment of the present disclosure.
Figure 1C:
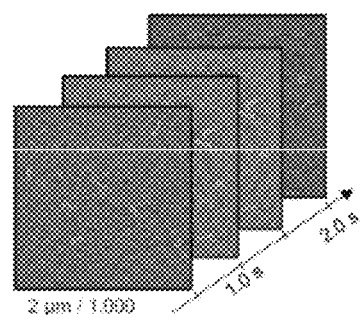
FIG. 1C is a set of exemplary images produced by the exemplary system, method, computer accessible medium and apparatus according to an exemplary embodiment of the present disclosure.

The exemplary system, method, computer-accessible medium and apparatus can utilize an exemplary physical mapping procedure characterizing, for example, genomic DNA using CRISPER/Cas9 which can be used for constructing high resolution maps from few or even single DNA molecules, with a one-step labeling chemistry, and high speed ("HS") atomic force microscopy ("AFM") detection making it inexpensive and scalable (see e.g., FIGS. 1A-1C). While AFM has always possessed high measurement accuracy in DNA sizing and mapping studies (see, e.g., Reference 12), it has suffered from low throughput and technical complexity. By cost-effectively overcoming the throughput hurdle, it is possible to unlock the high resolution potential of AFM mapping, thus placing mapping and sequencing on the same footing with comparable exponential technological growth curves (e.g., similar to that of Moore's law in computing). The exemplary HS-AFM procedure can be complementary to both sequencing and other physical mapping approaches, with sizing ranges from tens to hundreds of thousands of base pairs, utilizing an uncomplicated and rapid protocol; it can be well suited therefore to detecting structural genomic variations as well as to de novo sequence assembly using NGS data. One of skill will understand that, in addition to HS-AFM, other scanning probe-labelling techniques may be used such as, but not limited to, scanning probe electrical conductivity, wherein height is not measured with a displacement sensor but inferred from changes in conductivity; this technique would require the substrate and AFM tip to be slightly conductive.

FIG. 1A shows Cas9 labeling chemistry and sample preparation work flow according to an exemplary embodiment of the present disclosure. As shown in FIG. 1A, (I) target DNA can be incubated with Cas9-sgRNA and fixed with formaldehyde; (II) unbound Cas9-sgRNA complexes and deposit molecules on mica can be removed; and (III) a sample can be imaged with HS-AFM, and locations of labels on DNA can be measured. As shown in FIG. 1B, a high-speed contact mode AFM is shown to scale as compared to a coffee mug. The cantilever deflection can be measured with a Polytec compact laser Doppler vibrometer capable of capturing 2.5 million height measurements per second with a noise floor below 200 pm. The zoom-in view of the x-y flexure scanner shows the relative positions of the sample, cantilever and laser vibrometer objective. Piezo stick-slip motors below the scanner can provide coarse positioning in x, y and z. The HS-AFM can produce two 16-bit, 1000×1000 pixel images per second. Scan sizes are 0.5-5 microns square (2 microns typical), yielding 0.5-5 nm pixel sizes (see e.g., FIG. 1C).

Figure 8:
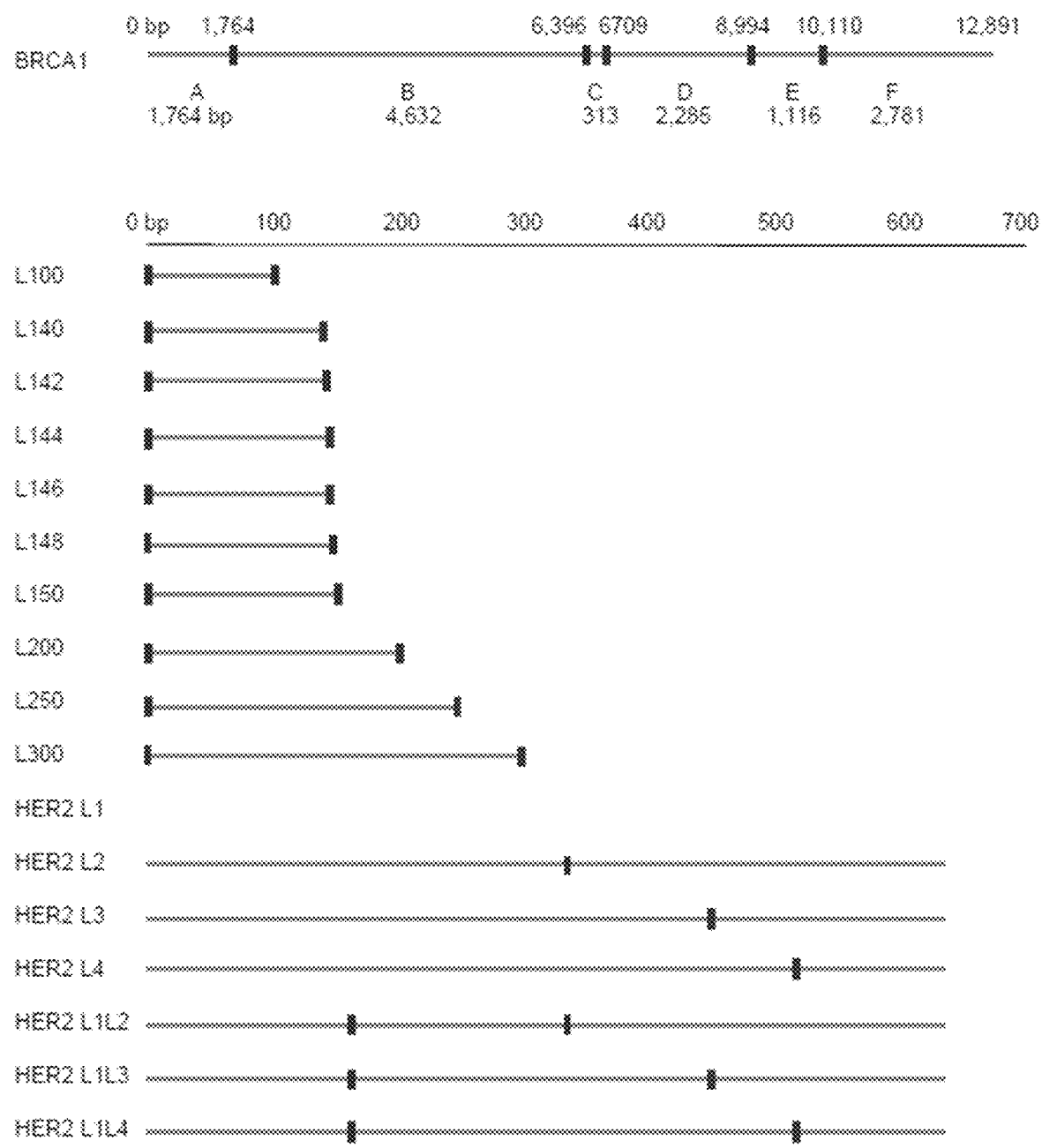
FIG. 8 is an exemplary diagram of DNA constructs according to an exemplary embodiment of the present disclosure.

The efficiency and precision of Cas9 labeling was demonstrated using several gene-specific sgRNAs targeted to BRCA1, HER2 and TERT gene sequences (see, e.g., FIG. 8 for a summary of the different DNA constructs used). Cas9 formed sequence specific complexes with sgRNA at high efficiency (e.g., median 90% per site labeling rate) and labels were localized on individual molecules with very high precision. The exemplary detection procedures can be used for precise quantification of multiple DNA sequences in complex mixtures, as well as to map DNA at high spatial resolution to facilitate an accurate assembly of short-read NGS data, and to detect structural genomic variations unresolvable by other procedures.

Existing optical mapping methods can be based on recognition of short sequences by enzymes such as restriction nucleases, nicking endonucleases and methyltransferases (see, e.g., References 9, 10 and 12-14); however, only a limited number of different sequences can be available, and the distribution of recognition sites of such enzymes throughout the genome can be uneven. Further, while CRISPR/Cas9 nickase was recently applied to introduce sequence-specific fluorescent labels for optical DNA mapping (see, e.g., Reference 15), the nickase-mediated labeling protocols used can be multistep processes, including several enzymatic reactions (e.g., introduction of nicks, incorporation of labeled nucleotide with terminal transferase or polymerase, etc.) that utilizes 300-900 ng of DNA labeling input amount (see, e.g., Reference 8). In contrast, the CRISPR/Cas9 labeling protocol used here can be simple and, can consist of mixing all components together followed by incubation, fixing and purification. 100 ng of DNA input amount was used; however, decreasing the amount down to below 10 ng does not significantly change labeling efficiency, and a lower limit was not determined. Optimization of the exemplary protocol can be as follows: when the labeling rate may not be sufficient, the concentrations of either sgRNA or Cas9 or both can be increased. The exemplary labeling protocol can also be easily incorporated into an automated sample preparation workflow. This can be applied to quantify RNA sequences as it was shown that Cas9 can cleave DNA-RNA hybrid, although with reduced efficiency (see, e.g., References 16 and 17).

Figure 2A:
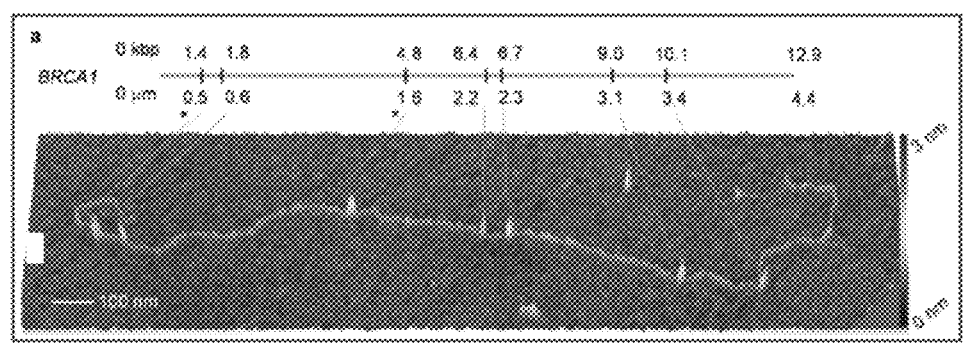
FIG. 2A is an exemplary map of a high-speed atomic force microscopy image of a Cas9-labelled BRCA1 amplicon according to an exemplary embodiment of the present disclosure.
Figures 2B, 2C:
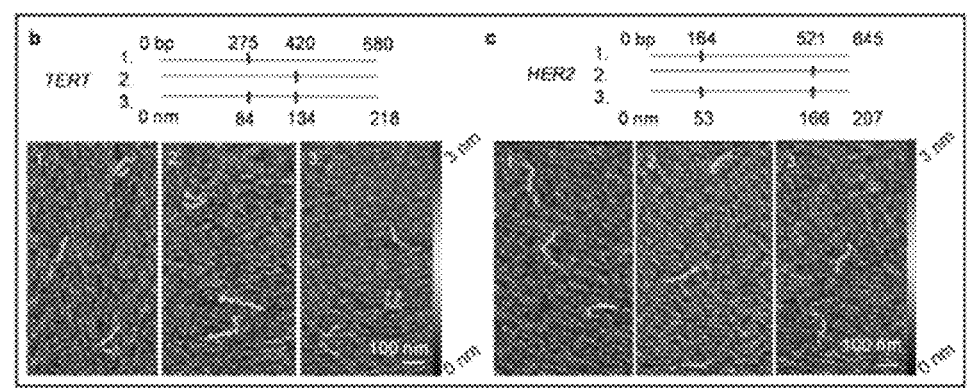
FIGS. 2B and 2C are exemplary sequence maps, and corresponding high-speed atomic force microscopy images, of singly- and doubly-labeled (B) TERT and (C) HER2 constructs according to an exemplary embodiment of the present disclosure.

FIGS. 2A-C show HS-AFM images of complexes of wild-type Cas9/sgRNA with BRCA1 (e.g., 12,900 bp), HER2 (e.g., 645 bp) and TERT (e.g., 680 bp) amplicons. Bound globular particles are present on the DNA molecules in close proximity to the expected target sequence locations. Note that no significant cleavage of DNA by wild-type Cas9 nuclease at the exemplary experimental conditions was observed. To label the BRCA1 amplicon, a single sgRNA, which matches a subset of naturally occurring Alu I repeats in the genomic locus, was used. In this exemplary case, the labeling rate was about 90% for perfect sgRNA match sites and about 50% less frequent at sites with a single mismatch (see FIG. 8 for further exemplary images.) Alu repeats can be the most abundant repetitive element in the human genome, making up 10% of the total sequence. As such, Alu repeats can be convenient, densely spaced, targets for CRISPR/Cas9 mapping. For example, the tumor suppressor BRCA1 gene sequence consists of about 42% of Alu repeats (see, e.g., Reference 5). Moreover, Alu repeats can mediate some cancer-related genome variations, including deletions or duplications of exons in BRCA1 (see, e.g., References 2, 3 and 18-20).

FIGS. 2B and 2C show sequence maps and corresponding HS-AFM images of singly- and doubly-labeled TERT and HER2 constructs. The sharp bend induced in the DNA backbone by the sgRNA-Cas9 complex is evident in both figures.

Custom sgRNAs were created to label the smaller TERT and HER2 amplicons (e.g., approximately 650 bp), for the purposes of accurately determining positioning accuracy and labeling kinetics. For the TERT amplicon, two unique sgRNAs were tested independently and in combination; for HER2, five unique sgRNAs were tested independently and in combination. A ladder series of typical polymerase chain reactions ("PCR") amplicons (e.g., 75 bp to 300 bp long), was measured and synthesized, which was labeled at each end.

Figure 3:
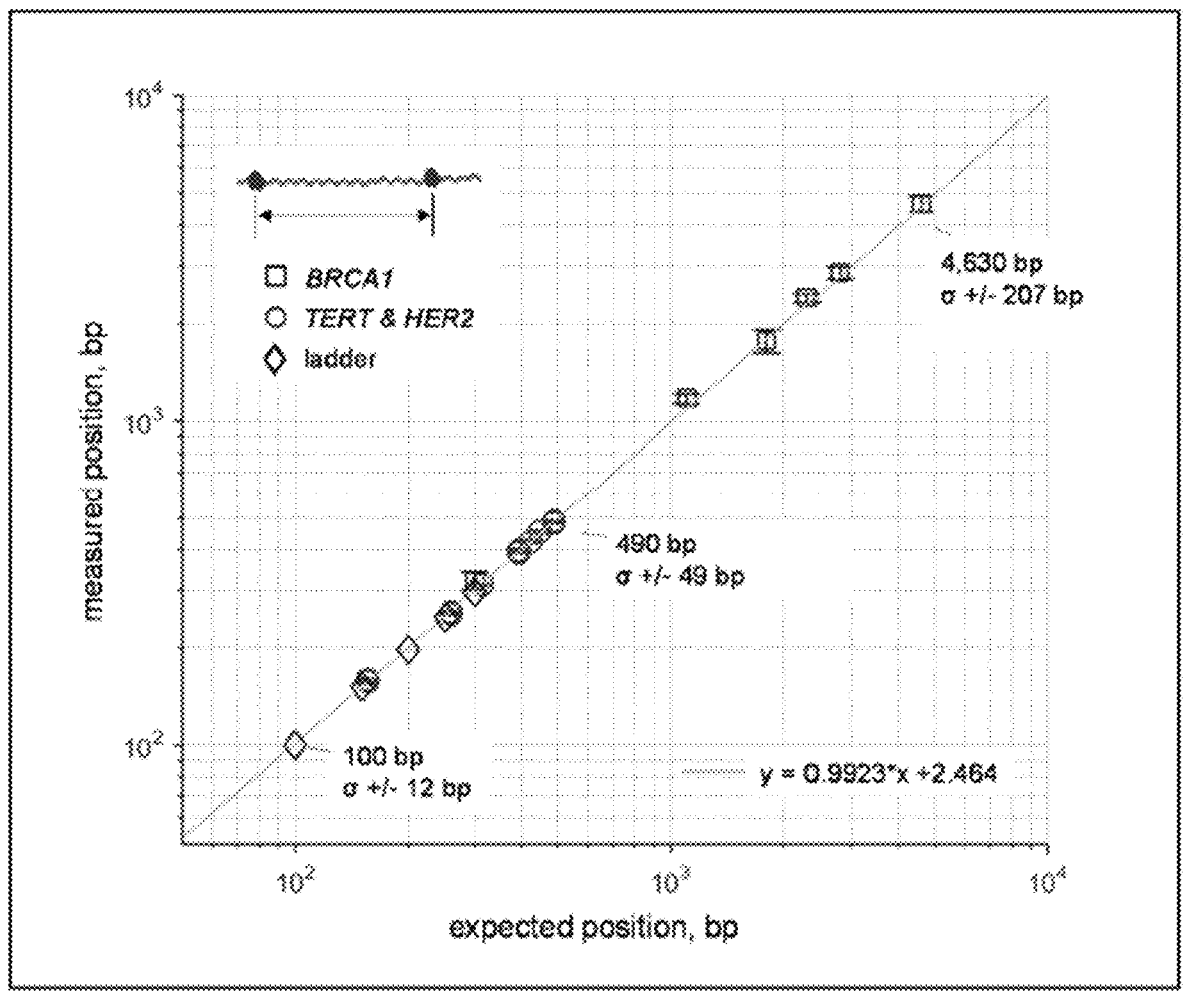
FIG. 3 is an exemplary graph of measured position versus expected position of the Cas9 labels determined for BRCA1, TERT/HER2 and ladder constructs according to an exemplary embodiment of the present disclosure.

The spatial resolution of labeling, for example, the precision of location of the label on DNA molecule, can be an important parameter in DNA mapping (see, e.g., Reference 12). As shown in the graph of FIG. 3, the HS-AFM positional measurements were highly accurate in an absolute sense and linear over the measured range of about 100 bp to about 4,550 bp. When pooling measurements from a large number of identical molecules (e.g., approximately 15,000 counts per species), 2 bp differences in PCR amplicon size (see e.g., FIG. 4) were reliably discriminated. The labeling was highly efficient, with over about 90% of the expected sites containing a Cas9 label (e.g., median 94%, range 89%-99%). One sgRNA species exhibited unusually low initial labeling rate (e.g., 35%); this was improved to about 87% by increasing the sgRNA concentration three-fold vs standard conditions. These statistics suggest that many DNA sequences containing a GG motif can be targeted with proper reaction optimization. Off-target binding, defined as labels greater than 2 S.D. from their expected location, was quite low, and did not exceed about 6% on a per site basis. The off-target binding rate can depend on experimental conditions (e.g., concentration of Cas9 and sgRNA), and can also be optimized. Storage of the purified complexes overnight at +4° C. does not significantly change the labeling efficiency. Labeling efficiency values for the different sgRNAs are presented in Table 1 below.

TABLE 1

Closely spaced ladder, measurement detail.
Ladder 140-150 bp

| Amplicon | Actual bp | Measured nm* | σ nm | CI95% bp | N |
|---|---|---|---|---|---|
| L140 | 140 | 47.2 | 6.9 | 0.12 | 13,760 |
| L142 | 142 | 47.8 | 5.9 | 0.11 | 12,133 |
| L144 | 144 | 48.3 | 6.1 | 0.08 | 21,697 |
| L146 | 146 | 49.8 | 7.2 | 0.12 | 14,136 |
| L148 | 148 | 50.1 | 7.1 | 0.14 | 9,483 |
| L150 | 150 | 51.0 | 6.7 | 0.09 | 20,305 |

FIG. 3 further shows measured position versus expected position of the Cas9 labels determined for BRCA1, TERT/HER2 and ladder constructs. Error bars represent the 95% confidence interval of the mean. For the TERT/HER2 and ladder data points, the symbol diameter is larger than the 95% confidence interval span. The expected size and sample standard deviation (a) are indicated at three points for reference.

Figure 4:
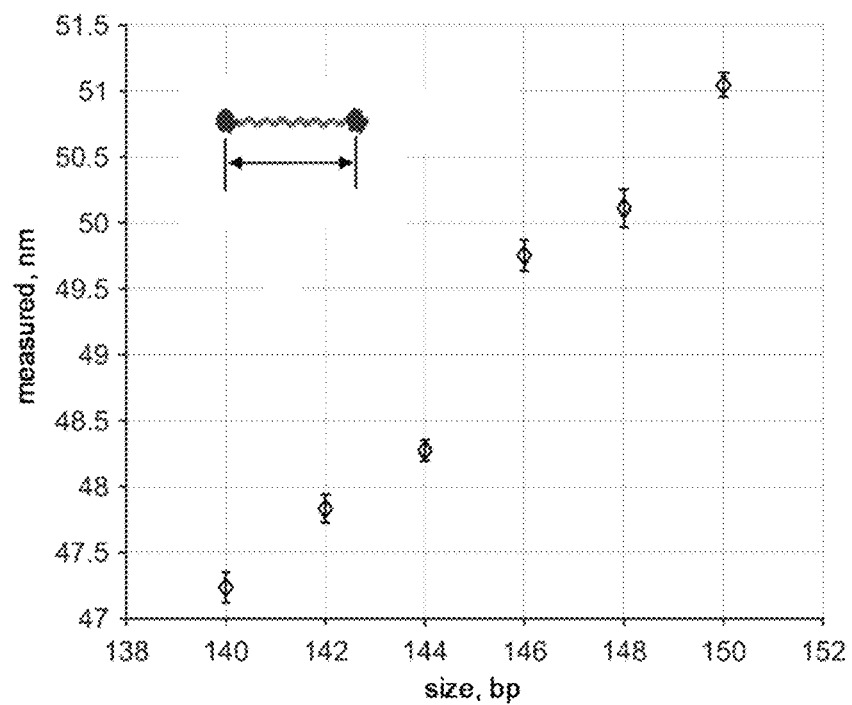
FIG. 4 is an exemplary graph of 140-150 bp ladder constructs end labeled with Cas9 according to an exemplary embodiment of the present disclosure.

As shown in the graph in FIG. 4, the plot of 140-150 bp ladder constructs are end labeled with Cas9. Error bars represent the 95% confidence interval. Each data point represents the median of approximately 15,000 individual measurements.

The exemplary system, method, computer-accessible medium and apparatus can replace a laser vibrometer, the most costly hardware component (e.g., approximately $60,000), with an optical pickup unit ("OPU"), for example from a DVD player (see, e.g., Reference 21 and FIGS. 5A-5E and 10). Exemplary embodiments below are described in reference to an OPU, however, any suitable scanning probe arrangement can be used. The exemplary OPU module uses an astigmatic focusing scheme to sense the vertical displacement of the HS-AFM cantilever; the image of the tightly focused laser spot (e.g., λ 650 nm) changes shape on the quadrant photodiode detector as the cantilever can be moved vertically. Nanometer displacement sensitivity is achievable by the OPU without modification, using, for example, a low noise power source. Exemplary low noise power sources can have noise floor displacement of less than 300 picometers (RMS values) or less than 200 Picometers (RMS value). Various power sources can be used (e.g., a battery power source).

Figure 5A:
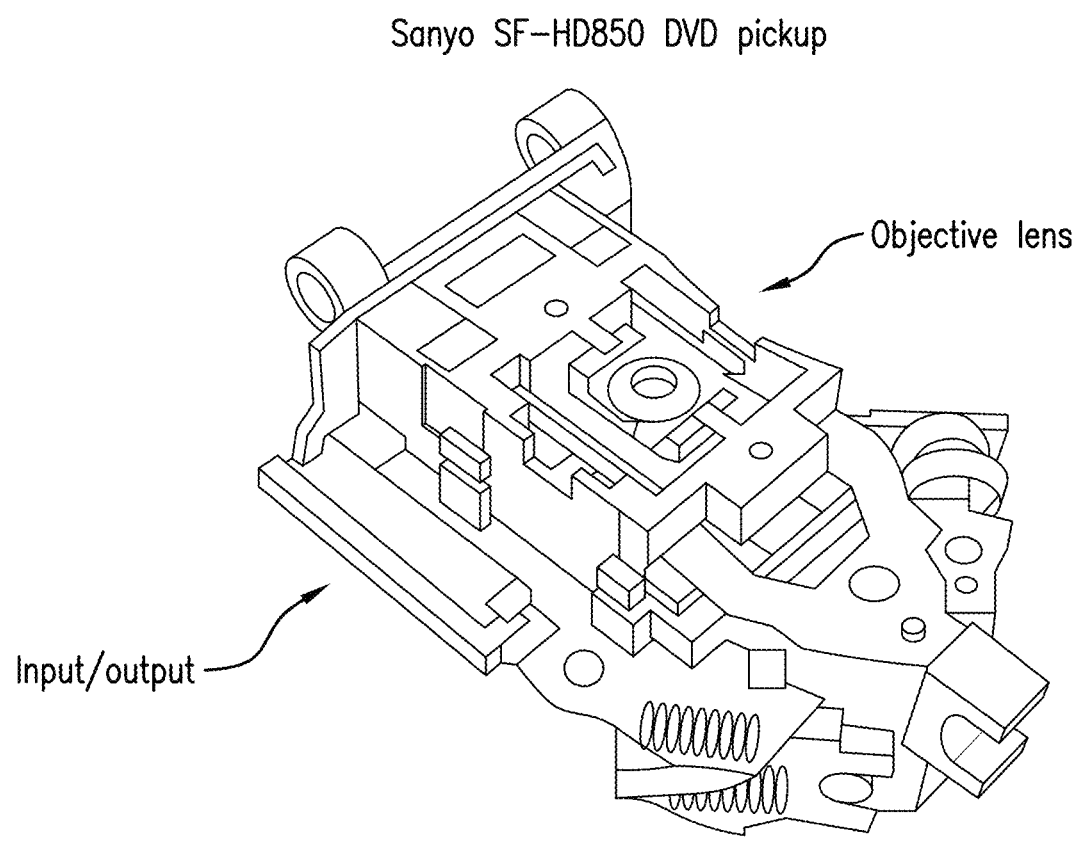
FIG. 5A is an exemplary photograph of an exemplary DVD player optical pickup unit used in the exemplary system, method, computer accessible medium and apparatus showing the location of a laser focusing objective and the signal and control connection point according to an exemplary embodiment of the present disclosure.
Figure 5B:
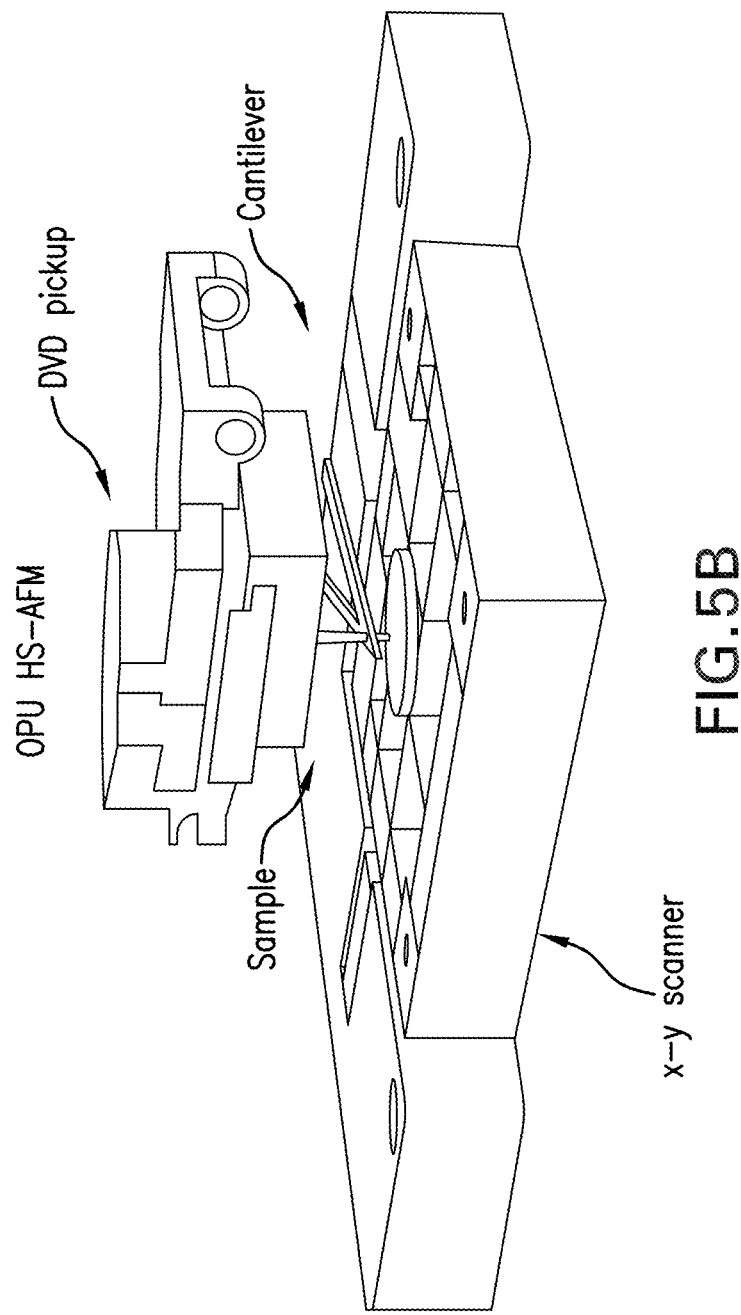
FIG. 5B is an exemplary diagram of the high-speed atomic force microscopy scan stage with an exemplary DVD optical pickup used as the cantilever displacement sensor according to an exemplary embodiment of the present disclosure.

FIG. 5A shows a photograph of the exemplary DVD player optical pickup unit showing the location of the laser focusing objective (e.g., 0.6 numerical aperture) and the signal and control connection point. Behind the objective lens is the 650 nm wavelength diode laser, quadrant photodiode and associated optics. FIG. 5B shows an exemplary schematic of the HS-AFM scan stage with the DVD optical pickup used as the cantilever displacement sensor. The detection bandwidth of the pickup unit exceeds 8 million samples per second, but as used here the cantilever deflection signal was captured at a rate of 2 million samples per second.

Figure 5C:
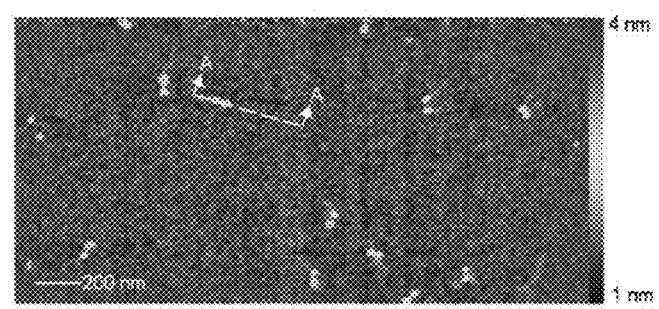
FIG. 5C is an exemplary image of TERT amplicons labeled with two Cas9 proteins according to an exemplary embodiment of the present disclosure.
Figure 5D:
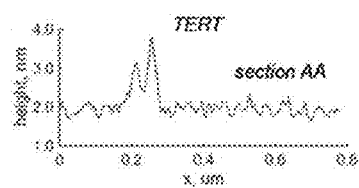
FIG. 5D is an exemplary graph illustrating the height cross section from double labeled molecules obtained with the exemplary DVD optical pickup according to an exemplary embodiment of the present disclosure.
Figure 5E:
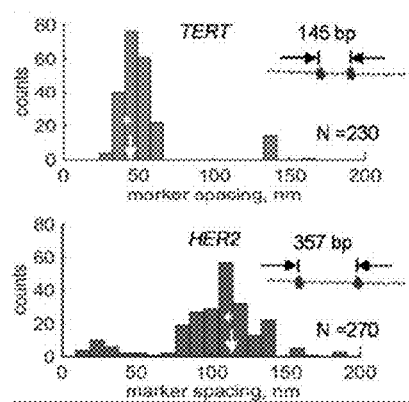
FIG. 5E is a set of exemplary histograms of Cas9 marker spacing measured for populations of TERT and HER2 molecules according to an exemplary embodiment of the present disclosure.

FIG. 5C shows an exemplary image of TERT amplicons labeled with two Cas9 proteins. The labels are resolved, as is the DNA backbone in some cases, indicating the noise floor is at or slightly below the level of the DNA height (e.g., approximately 300 pm). This image was obtained by averaging five full frames collected at the maximum frame rate of 2 frames per second. FIG. 5D shows a chart of the typical height cross section from double labeled molecules obtained with the DVD optical pickup. FIG. 5E shows a set of histograms of Cas9 marker spacing measured for populations of TERT and HER2 molecules. The median center-to-center spacing between the two TERT markers was 47.7 nm (e.g., s.d. 8.1 nm) vs. 46.9 nm expected; and for HER2 was 108.2 nm (e.g., s.d. 17.1 nm) vs 114.1 nm expected.

The OPU can have onboard voice coil actuators to focus the detection beam, and possess integrated laser control electronics and high bandwidth (e.g., greater than 10 MHz) signal amplifiers, making it ideal for rapid, high precision displacement sensing. The OPU HS-AFM produced similar quality images as the vibrometer, with a lower frame rate of 0.5-1 frames per second due to the utilized frame averaging. In these images, the Cas9 labels can be sharply visible, as can be the DNA backbone in some cases. The Cas9 intra-label spacing on doubly-labeled TERT and HER2 amplicons was determined with an accuracy and precision equivalent to that achieved with the significantly more expensive laser vibrometer.

With no modifications, this OPU HS-AFM can be used to detect and measure length polymorphisms between closely spaced markers (e.g., less than 400 bp). The multiple Cas9 labels can also be used as simple single molecule barcodes, making the technology useful in counting applications such as detecting gene copy number variation, digital PCR or transcriptional profiling. Long DNAs (e.g., greater than 10 kbp) can be stretched linearly for genomic mapping using exemplary DNA elongation procedures such as micro- or nano-channels, pressure and electrokinetic flow devices, or laser/magnetic tweezers.

Figure 6:
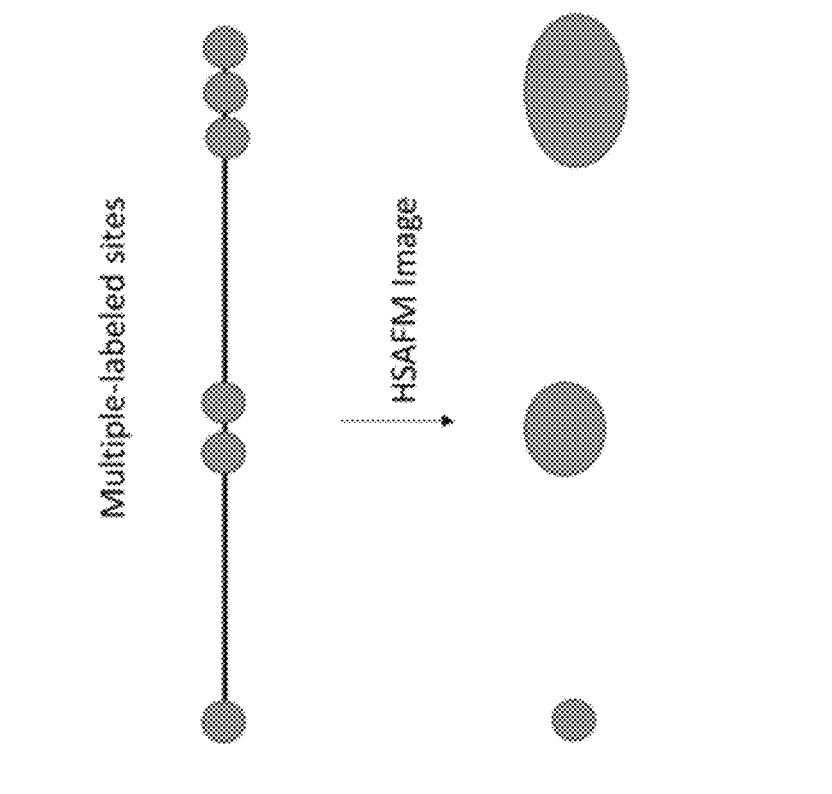
FIG. 6 is a set of exemplary diagrams illustrating the parallelization of the exemplary system, method, computer accessible medium and apparatus according to an exemplary embodiment of the present disclosure.
Figure 6:
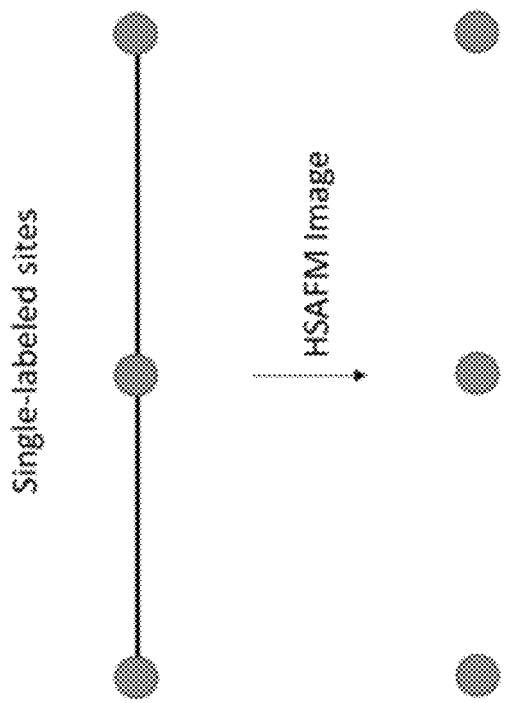
Figure 7A:
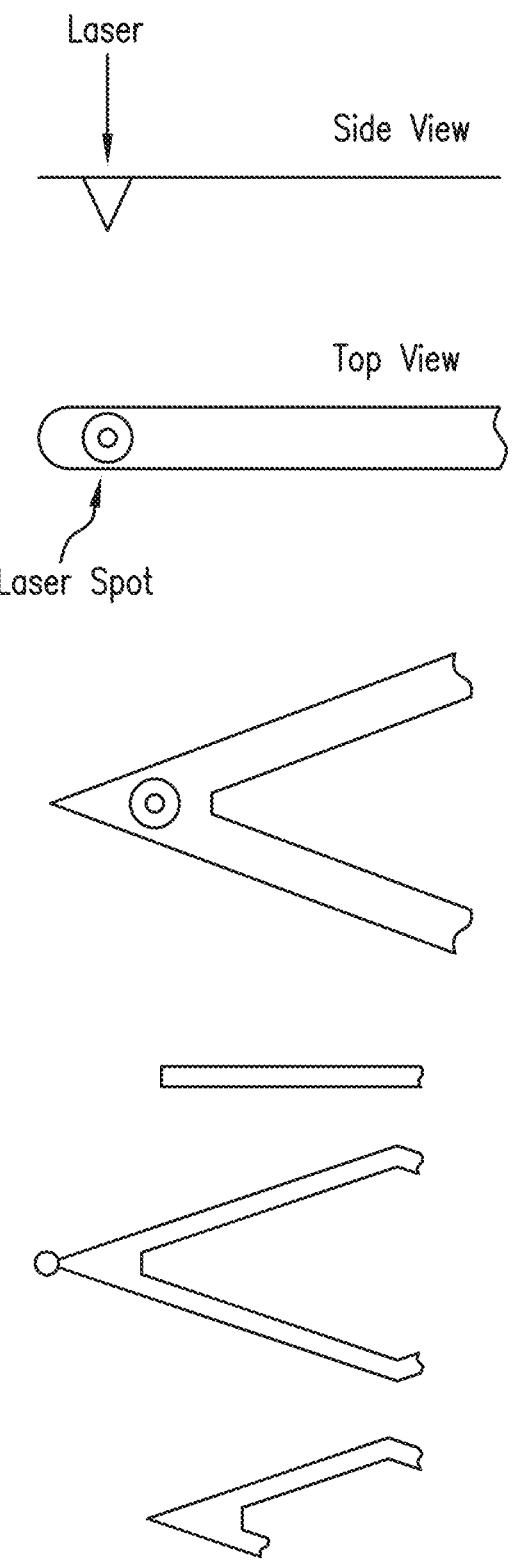
FIGS. 7A-7D is a set of exemplary diagrams of the exemplary optical pickup unit according to an exemplary embodiment of the present disclosure.
Figure 7B:
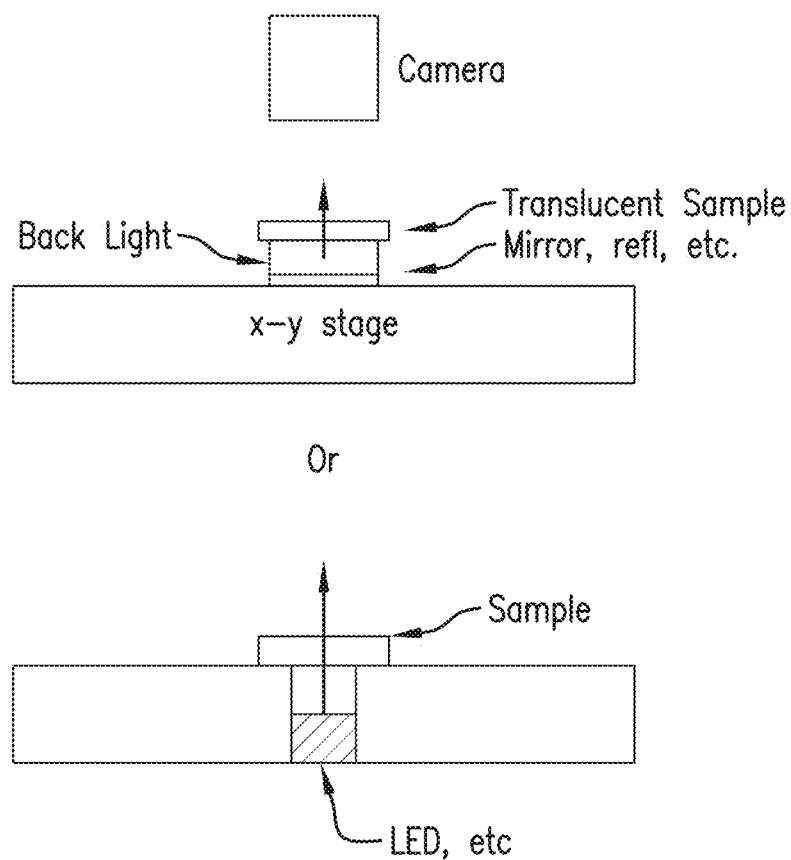
Figure 7C:
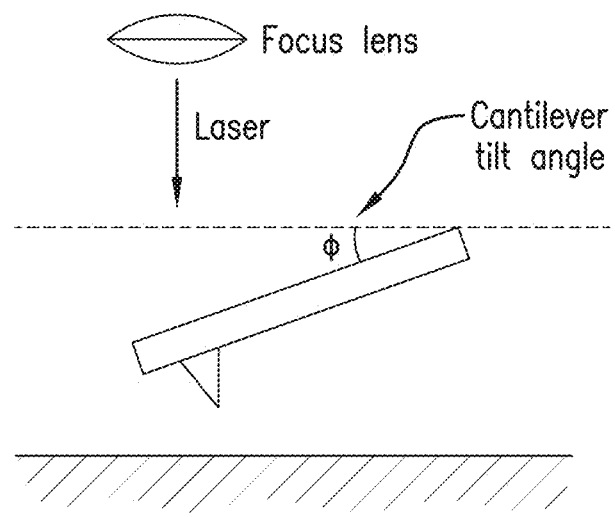
Figure 7D:
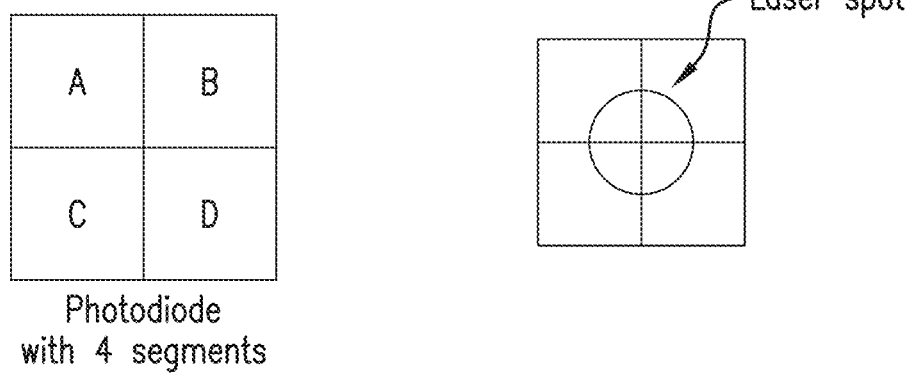

Achievable improvements in signal-to-noise and drift compensation (see, e.g., References 10 and 23) can facilitate the OPU to reliably detect the DNA backbone, as well as the Cas9 labels. Moreover, DVD OPUs have typical detection bandwidths of 80 MHz, and Blu-ray OPUS can be even higher, at 400 MHz. Thus, if a higher sampling rate digitization electronics can be used, the pixel rate of an OPU-based instrument can be increased from the 2 MS/s to as high as 80 or even 400 MS/s, depending on the OPU model used. By increasing the scan speed and image size, these higher pixel rates can be directly translated into measurement throughput. The cost of the exemplary system, method, computer-accessible medium and apparatus can reduce the overall cost of the HS-AFM system by more than an order of magnitude. The cost of the OPU detector can be roughly that of the cantilever itself, making the exemplary system, method, computer-accessible medium and apparatus, unlocking scalable high throughput (see e.g., diagrams shown in FIG. 6).

Exemplary Optical Pickup Unit

FIGS. 7A-7D show diagrams of an exemplary OPU according to an exemplary embodiment of the present disclosure. A laser spot from displacement sensor (DVD or vibrometer) can be placed directly over the part of the cantilever which can contact the surface or molecule (see e.g., FIG. 7A). The sample can be translucent and can be backlit in order to aid in adjusting the vertical position of the cantilever as it is brought into contact with the surface (see e.g., FIG. 7B). As different spots on the sample are imaged, the position of the cantilever can move (e.g., up or down). Thus, the exemplary system, method, computer-accessible medium and apparatus can automatically adjust the position of the cantilever to account for any movement during sample imaging. The tilt angle of the cantilever vs. optical axis of the laser pickup lens can be less than 10 degrees (e.g., 7 degrees). This can be shallower than what can be considered to be standard for AFM, and can facilitate more light to be reflected back into the detector, substantially improving the signal to noise ratio (see e.g., FIG. 7C).

The exemplary system, method, computer-accessible medium and apparatus can utilize a DVD laser, although a CD laser can be used as well. Lasers with shorter wavelength (ex. Blu-ray, which is about 405 nm) can be used to increase the resolution. The noise floor of the exemplary system, method, computer-accessible medium and apparatus can be lower than 300 picometers (e.g., RMS) in order to resolve the DNA molecule backbone. It can also be lower than 3 nanometers to resolve the CRISPR labels. A power source with very low electronic noise can be utilized (e.g., a battery source). The detector can include 4 photodiode elements which can sense the shape of the reflected laser spot. In an exemplary embodiment, the signal from each of the four elements can be separately and simultaneously digitized to provide optimal performance. In some exemplary cases, the signal can be recorded in a differential format (e.g., order), such as A-D and B-C. In this exemplary case, only two composite signals need be recorded (see e.g., FIG. 7D).

Exemplary Materials and Methods

Primers and sgRNA were obtained from Integrated DNA Technologies. Sequences are shown in Table 2. sgRNA were prepared according to the manufacturer's recommendations. Wild-type Cas9 protein was purchased from New England Biolabs, Cas9 (e.g., D10A) nickase and Cas9 (e.g., D10A and H840A) from Novateinbio.

TABLE 2

Primer and sgRNA sequences.

| Gene Targeted | Name | Sequence | |
|---|---|---|---|
| Primers: | | | |
| TERT | T680-f | AGGTCGGAACGAGGGTCACG | SEQ ID NO: 1 |
| TEAT | T680-r | TGTCCTCACGCTCTCGGGTG | SEQ ID NO: 2 |
| HER2 | H645-f | GGCCAGAGGACGAGTGTGGT | SEQ ID NO: 3 |
| HER2 | H645-r | CTCAGGGTGGCACGGCAAAC | SEQ ID NO: 4 |
| BRCA1 | BRCA1-f | ACCCCAACATTGATTCCTTTC | SEQ ID NO: 5 |
| BRCA1 | BRCA1-r | CACAGGGAGAAAGTCTGCAAG | SEQ ID NO: 6 |
| Ladder | Ladder-Primer | GTGATCCACCTGCCTCGG | SEQ ID NO: 7 |

Probes:

Ladder-Probe-75 bp   SEQ ID NO: 8
GTGATCCACCTGCCTCGGTGTAATCCCAGCACTTTGGGAGGAACAAATCATCAAGAAATGATGGGC
Ladder-Probe-100 bp  SEQ ID NO: 9
GTGATCCACCTGCCTCGGTGTAATCCCAGCACTTTGGGAGGTGACTGCCCCAGCATAC
Ladder-Probe-150b    SEQ ID NO: 10
GTGATCCACCTGCCTCGGTGTAATCCCAGCACTTTGGGAGGACTTTTTCCCTCTAACTCTTTTTCCC
Ladder-Probe-200 bp  SEQ ID NO: 11
GTGATCCACCTGCCTCGGTGTAATCCCAGCACTTTGGGAGGGGGATGGGTAAGGATTTGAGAACTGC
Ladder-Probe-200 bp  SEQ ID NO: 12
GTGATCCACCTGCCTCGGTGTAATCCCAGCACTTTGGGAGGTCAGAAGTCTTCTCTGCCCACATACC
Ladder-Probe-300 bp  SEQ ID NO: 13
GTGATCCACCTGCCTCGGTGTAATCCCAGCACTTTGGGAGGGTGAGCAAGACTGGCACCTG

| sgRNAs: | | | |
|---|---|---|---|
| TEAT | 275 bp | r(GUAUCCCUGGAGCUUCGGUCUGG) | SEQ ID NO: 14 |
| TEAT | 420 bp | r(CACACUCCUCCCAGAGCGGCCGG) | SEQ ID NO: 15 |
| HER2 | 164 bp | r(GCUAGAGAAGCCAUGCCAAGAGG) | SEQ ID NO: 16 |
| HER2 | 335 bp | r(UCCCUGGUUCACUUGGACCUGG) | SEQ ID NO: 17 |
| HER2 | 451 bp | r(UCAACUGCAGCCAGUUCCUUCGG) | SEQ ID NO: 18 |
| HER2 | 521 bp | r(CGAGUACUGCAGGGGUAUGAGGG) | SEQ ID NO: 19 |
| BRCA1 | Alu-sgRNA | r(UGUAAUCCCAGCACUUUGGGAGG) | SEQ ID NO: 20 |

Exemplary DNA Constructs

FIG. 8 shows exemplary maps of the constructs indicating the position of the Cas9 labels. For HER2 and TERT, primers were designed with Primer Blast software (see e.g., Table 2 below for sequences), while primers sequences for BRCA1 were taken (see, e.g., Reference 24). PCR solutions for HER2 and TERT amplicons contained 200 nM primers each, 100 ng of Human Genomic DNA: Female (e.g., Promega) and 1× of LongAmp Hot Start Taq 2× Master Mix (e.g., New England Biolabs) in 20 microliter reaction volume. Amplification protocol for HER2 and TERT was: initial denaturation 95° C. for 30 sec, 35 cycles: 94° C. for 30 sec, 60° C. for 30 sec, 68° C. for 2 min, followed by final extension 68° C. for 5 min. For BRCA1, PCR solution composition and amplification protocol were the same as described in (see, e.g., Reference 24) (e.g., amplicon BRCA1.1, PRIMESTAR® GLX DNA Polymerase, Takara). All amplicons were purified with AGENCOURT® AMPURE® XP magnetic beads (e.g., BECKMAN COULTER® Life Sciences), eluted in TE buffer and quantified either with QUBIT® dsDNA HS Assay or QUBIT® dsDNA BR Assay kit (e.g., LIFE TECHNOLOGIES®).

For the BRCA1 amplicon, Alu-family repeats containing the GG sequence to be used as a PAM site were identified with RepeatMasker software. Using BLAST software, five perfect and five 1- or 2-base mismatched sites to the chosen sgRNA sequence were found, which are designated Alu-sgRNA in Table 3 below.

TABLE 3

Alu target sequences in BRCA1 amplicon.

| Target sequence | Location from 5' end | Number of mismatches to sgRNA | Sequence Number |
|---|---|---|---|
| CCTCCTAAAGTGCTGGGATTACA | 495 | 1 | SEQ ID NO: 21 |
| CCTCCCAAAGTGCTAGGATTACA | 1457 | 1 | SEQ ID NO: 22 |
| CCTCCCAAAGTGCTGGGATTACA | 1764 | 0 | SEQ ID NO: 23 |
| CCTTCCAAAGTGCTGGGATTACA | 3301 | 1 | SEQ ID NO: 24 |
| CCTCCCAAAGTGCTAGGATTACA | 4818 | 1 | SEQ ID NO: 25 |
| CCTCCCAAAGTGCTGGGATTACA | 6418 | 0 | SEQ ID NO: 26 |
| CCTCCCAAAGTGCTGGGATTACA | 6731 | 0 | SEQ ID NO: 27 |

TABLE 3-continued

Alu target sequences in BRCA1 amplicon.

| Target sequence | Location from 5' end | Number of mismatches to sgRNA | Sequence Number |
| --- | --- | --- | --- |
| CCTCCCAAAGTGCTGGAATTATA | 7835 | 2 | SEQ ID NO: 28 |
| CCTCCCAAAGTGCTGGGATTACA | 9013 | 0 | SEQ ID NO: 29 |
| CCTCCCAAAGTGCTGGGATTACA | 10132 | 0 | SEQ ID NO: 30 |

Figure 11:
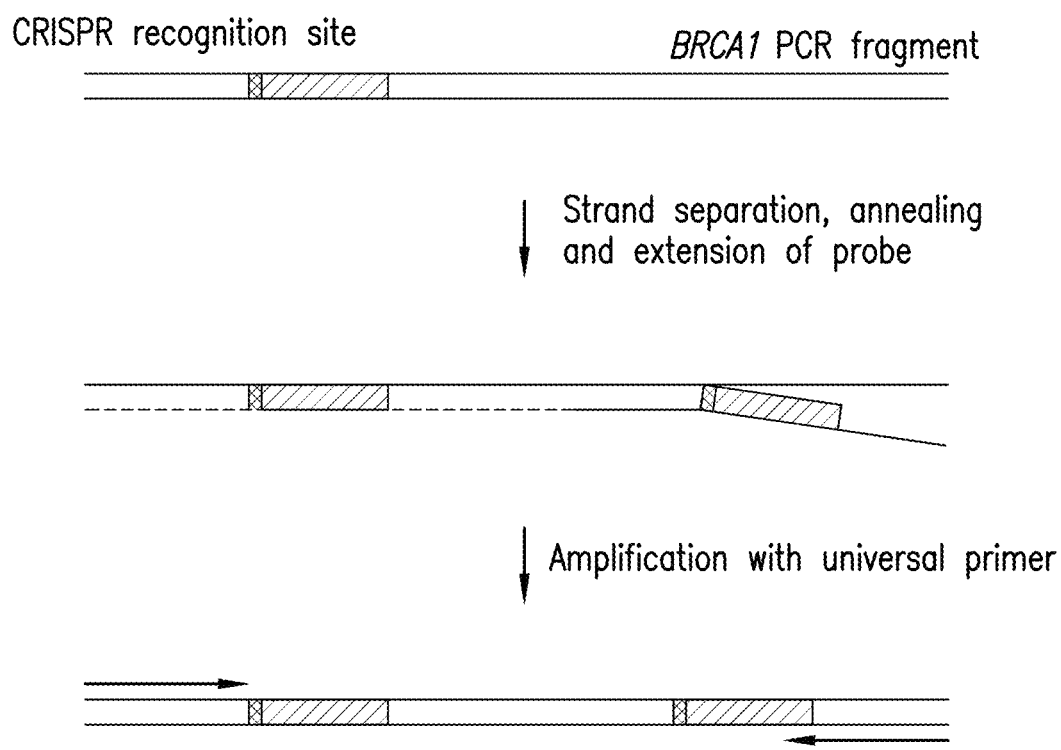
FIG. 11 is an exemplary diagram of a protocol for creating ladder constructs according to an exemplary embodiment of the present disclosure.

As shown in the diagram of FIG. 11 (e.g., which illustrates a procedure for creating ladder constructs), the ladder amplicons were synthesized with CRISPR recognition sites at the ends using different probes to introduce the recognition and primer sites. PCR solutions for ladder amplicons contained: 400 nM of Ladder-Primer (e.g., the same primer can be used as forward and reverse), 40 nM of Ladder-Probe, 1 ng of BRCA1 1750 bp amplicon and 1× of LONGAMP® Hot Start Taq 2× Master Mix (e.g., New England Biolabs, Woburn, MA) in a 20 microliter reaction volume. An exemplary amplification protocol for ladder amplicons was: initial denaturation 95° C. for 30 seconds, probe annealing and extension 50° C. for 5 minutes, 35 cycles: 94° C. for 30 seconds, 60° C. for 30 seconds, 68° C. for 1 minute followed by final extension 68° C. for 5 minutes. The ladder amplicons were purified and quantified using the same protocol as other amplicons. Labeling was done with Alu-sgRNA (see e.g., Table 2) using standard labeling protocol.

Exemplary Labeling Reaction

Figure 12:
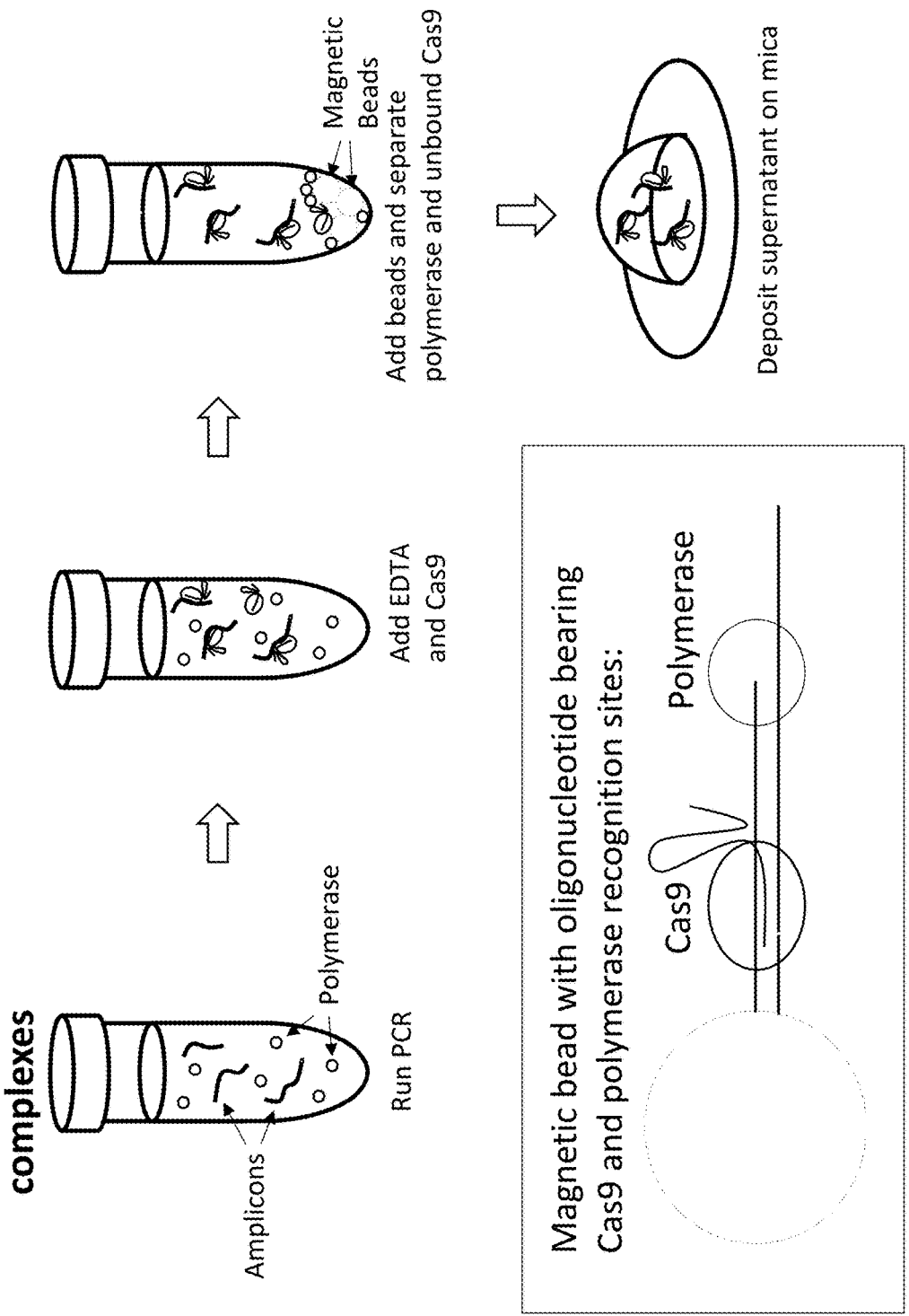
FIG. 12 is an exemplary flow diagram of single-tube labeling using Cas9 and the purification of DNA-Cas9 complexes according to an exemplary embodiment of the present disclosure.

The exemplary protocol can be based on in vitro digestion of DNA with Cas9 protocol, e.g., New England Biolabs (see e.g., flow diagram shown in FIG. 12 which illustrates an exemplary single tube labeling and purification procedure). Ethylenediaminetetraacetic acid ("EDTA") was added to avoid cleavage of DNA, and the concentrations of Cas9 and sgRNAs were increased to improve the labeling rate. After labeling, Cas9-DNA complexes were fixed with formaldehyde and the unbound protein was removed with a magnetic bead-based purification system. 400 nM of each sgRNA were incubated with 200 nM of Cas9 protein in 1× Cas9 Nuclease Reaction buffer (e.g., New England Biolabs) supplemented with 50 mM EDTA (e.g., pH=8.0) at room temperature for 10 minutes; next amplicons were added to final concentration 5 ng/ul and incubated at 37° C. for 1 hour; formaldehyde was added to final concentration of about 1% and incubated at room temperature for 10 minutes next TRIS (e.g., pH=7.6) was added to final concentration of 750 mM and the labeled amplicons were purified with AGENCOURT® AMPURE® XP magnetic beads (e.g., BECKMAN COULTER® Life Sciences).

Figure 13:
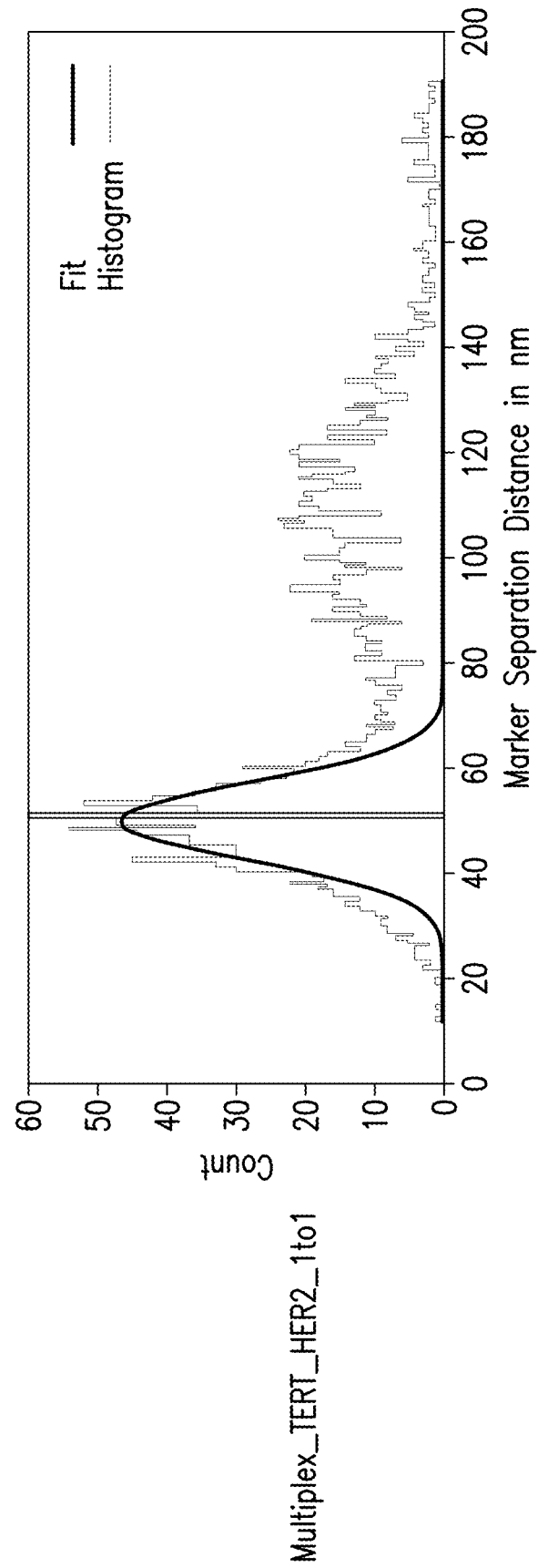
FIG. 13 is an exemplary histogram illustrating the detection of an abundance of species in a mixture of HER2 and TERT amplicons according to an exemplary embodiment of the present disclosure.

FIG. 13 shows an exemplary histogram illustrating the detection of an abundance of species in a mixture of HER2 and TERT amplicons according to an exemplary embodiment of the present disclosure. The abundance of species in a mixture of HER2 and TERT amplicons can be detected (e.g., real-time detection and quantification).

Figure 14:
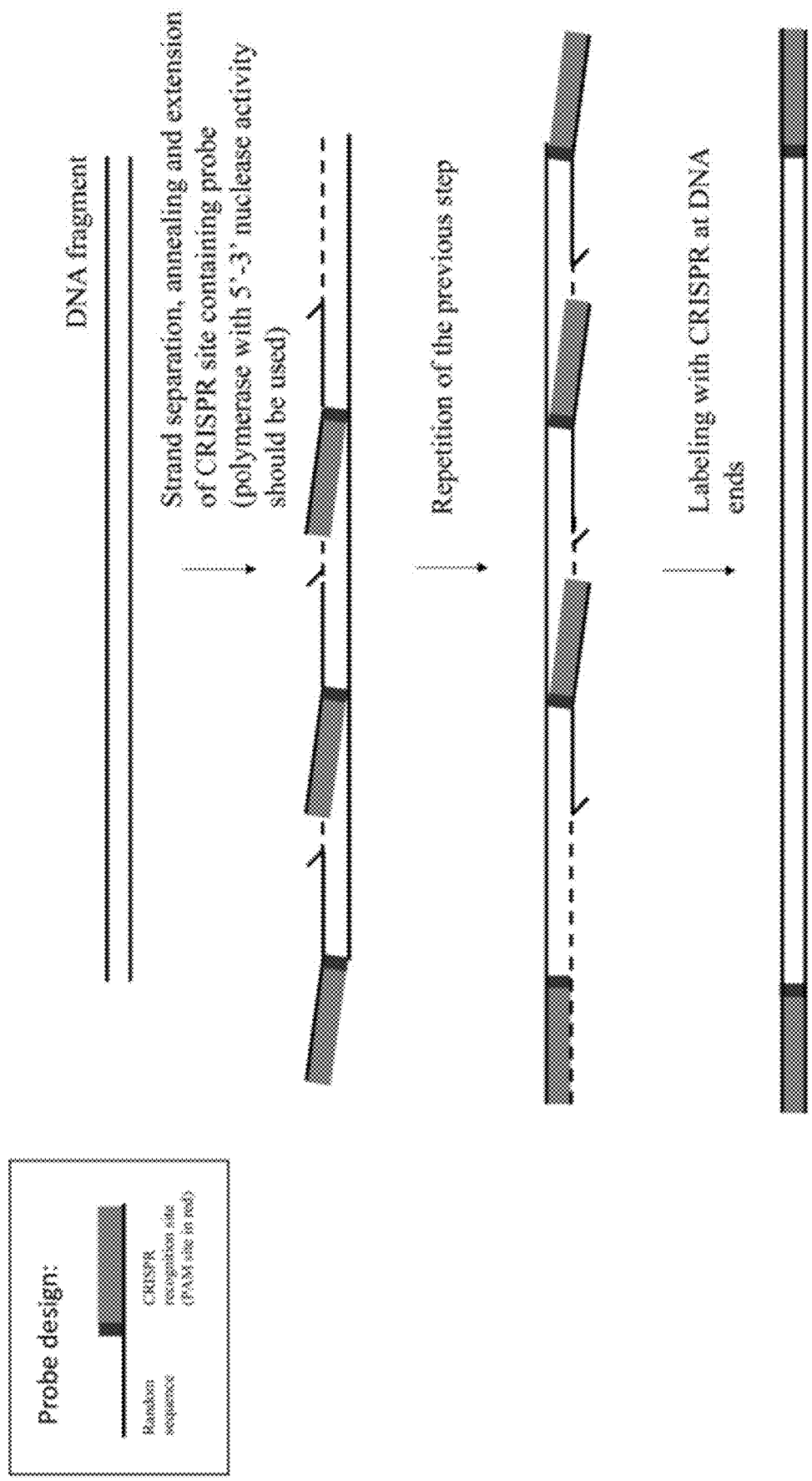
FIG. 14 is an exemplary diagram illustrating a highly sensitive amplification-free sizing of DNA according to an exemplary embodiment of the present disclosure.

FIG. 14 shows an exemplary diagram illustrating a highly sensitive amplification-free sizing of DNA according to an exemplary embodiment of the present disclosure. Highly sensitive amplification-free sizing of DNA are shown. Two CRISPR recognition sites (e.g., either same or different) are introduced during two step melting-annealing-extension protocol. This can be applied, for example, to sizing Circulating Cell-Free DNA ("ccfDNA").

Exemplary HS-AFM Sample Preparation and Imaging

For HS-AFM sample preparation (e.g., all samples except BRCA1), imaging and data analysis, an exemplary experimental protocol was used (see, e.g., References 25 and 26). One microliter of 100 ng/ul solution of the amplicons in deposition buffer (e.g., 10 mM TRIS, 10 mM MgCl2, pH=7.6) was deposited on freshly cleaved mica surface, incubated for 1.5 minutes in humid environment, rinsed three times with 200 ul of MQ water, baked at 120° C. for 20 minutes and cooled down to 40° C. in oven. For BRCA1, the only modification was made at deposition: the mica surface was tilted by 45 degrees to enable gravity-driven flow.

Exemplary Preparation of the DNA-CRISPR Complexes in Magnesium Free Solution

The solutions used in preparation and storage of the complexes preferably should not contain magnesium to prevent magnesium-mediated enzymatic activity of CRISPR nuclease. This can be obtained by the addition of chelating agents such as EDTA. Minimization of exposure of DNA-CRISPR complexes to magnesium during deposition on AFM slides can be beneficial. The complexes can be deposited within several seconds after addition of magnesium-containing deposition buffer. Incubation time is preferably less than 30-90 seconds. Alternatively, magnesium-free deposition chemistry can be applied (e.g. zinc, polyamine, 3-aminopropysilatrane ("APS") etc.). The flat surface onto which the complex is deposited can be "pre-treated" with Mg++ or Ni++ or amino-silane, etc., which enhances binding of the complex to the flat surface by creating an adhesive layer independently of the magnesium-free incubation mixture. Minimization of exposure of prepared AFM slide to humid environment can be beneficial. The slides can then be transferred to humidity-free chamber after preparation.

Exemplary Application of Short CRISPR-labeled DNA Molecules (<300 bp)

The spatial properties and conformational changes of A-, B-, Z,- and other forms of duplex DNA and non-canonical DNA structures such as triplexes, quadruplexes and four-way junctions of various sequence composition at different experimental conditions (pH, temperature, ions etc.) can be examined. This can include, for example, formation of triplexes or quadruplexes under certain conditions.

Structural variations of the above DNA structures caused by small molecules, proteins and other DNA-specific molecules can be examined. The small molecules can include but are not limited to, intercalators and a major and a minor groove binder. Binding to DNA can be either covalent or non-covalent. The alterations can include conformational changes of DNA duplex (e.g. unwinding of DNA helix, bending of DNA molecule, B-to A-form transition) and non-canonical DNA structures (e.g. changing the geometry of four-way junction) caused by binding of DNA-specific molecule(s). CRISPR-labeled DNA molecules can be employed as a highly sensitive biosensor to detect the presence of DNA-specific agents.

Damaged DNA, such as covalent DNA adduct, single-strand breaks, thymine dimers and abasic sites, can be examined, which can include: (i) DNA sequence content between the labels, (ii) Mismatched duplexes, (iii) Methylation of DNA bases, (iv) GC content of the bases between the labels, (v) Conformational changes to molecules bound to the DNA backbone in between the labels (such as enzymes, histones, etc.), or (vi) highly sensitive amplification-free sizing of DNA. Two CRISPR recognition sites (either the same or different) are introduced during two step melting-annealing-extension protocol. This can be applied, for example, to sizing Circulating Cell-Free DNA ("ccfDNA").

Individual amplicons in multiplex real-time PCR can be identified and quantified. Amplicon sequences can be used to target CRISPR, or CRISPR recognition sites can be introduced at the amplicon ends during amplification. This exemplary approach can provide sequence-specificity comparable to hydrolysable probe PCR with significantly increased multiplexing level.

Genetic variations, such as Single Nucleotide Polymorphism ("SNP"), short insertions and deletions (e.g., InDels) and others can occur. All genetic alterations resulting in change of DNA size can be visualized directly. For other genetic variations (e.g. SNP) another exemplary strategy can be used. To detect a small fraction of mutation at the background of wild-type DNA (e.g. presenting in ccfDNA) both mutated and wild type DNA can be co-amplified, and hybridized to form mismatched duplexes which can be resolved with mismatch-specific nucleases (e.g. T7 Endonuclease I) and labeled with CRISPR close to or at cleavage site. This exemplary approach can facilitate specific detection of amplicon bearing mutation(s).

In some embodiments, mutated nucleotides are detected using a rolling circle amplification scheme. As known in the art, a vector is used ligate the target nucleotide into a closed circle. The nucleotide is then amplified as a rolling circle to produce tandem copies and then labeled with CRISPR as described herein. The wildtype sequence will produce a repeated pattern of labels at known intervals. A mutated sequence will not bind label as efficiently as the wildtype and thus will produce irregular spacing between labels. In some embodiments, the CRISPR label is targeted to match the mutant sequence. Non-mutant sequences would thus have less CRISPR labeling. In some embodiments, this technique is used for more accurate measurement of spacing between labels. For example, less than 10 tandem repeats may be used to precisely measure the spacing that is less than 200-300 base pairs. With more precise measurement of spacing, more species, each with slightly different spacing between labels, can be identified in a mixture.

In order to improve labeling technology, modified Cas9 and guide RNA as well as other CRISPR systems can be used in addition to wild-type Cas9. One type of the protein modifications can be employed to improve sequence-specificity, for example, discrimination between perfect and mismatch recognition sites (e.g. genetically modified high-fidelity versions of Cas9). Another type of the protein and/or guide RNA modifications can facilitate changing volume of tertiary CRISPR-guide RNA-DNA to discriminate different sequences with HS-AFM (e.g. chemical attachment of biotin for further labeling with streptavidin). Other CRISPR systems with different PAM sequence can be employed to complement Cas9 (e.g. CRISPR-Cpf1 with TTTN PAM site). Additionally, other particles bound to DNA can be used as labels.

Multiplex Ligation-Dependent Probe Amplification (MLPA) with CRISPR-Labeled Amplicons AFM-Based Readout The systems and methods described herein also provide a substantial improvement to existing MLPA techniques. The improvement relates to the different readout method used. Standard MLPA readout is size-based electrophoretic separation of amplicons. Described herein are methods of detection and identification of individual amplicon molecules based on recognition of the amplicons' unique pattern of CRISPR labels.

Advantages of CRISPR/AFM detection of MLPA amplicons include:

1. Better sensitivity and dynamic range of AFM compared to currently employed capillary electrophoresis. This allows for detection of rare species in multiplex PCR and is important in applications such as highly sensitive mutation quantification and gene expression studies.
2. Using amplicons of the same size to eliminate size-related amplification bias in multiplex PCR: longer probes give lower signal. This allows for improving the precision of the technique and increasing the size of amplicons.
3. Increasing multiplexing level.

Features of the technique are:

1. MLPA probe and primer design. The MLPA probe sequence design is done using standard recommendations with the exception of amplicon size: it may be longer than recommended, e.g. greater than 300-400 bp. MLPA probes sequences should contain CRISPR recognition sites; these sites may be naturally occurring and/or artificially introduced.
2. MLPA sample preparation and reactions. Nucleic acid extraction and purification, reverse transcription (in case of RNA), preparation of reaction solution, MPLA ligation, treatment with methylation-sensitive nucleases (in case of methylation analysis) and all other pre-amplification steps are done with standard MLPA protocol. If longer than standard MLPA probes are used the amplification conditions should be optimized correspondingly (i.e. increasing extension time).
3. MLPA reaction post-amplification treatment. The amplicons can be treated with enzymes such as mismatch-specific nuclease, if necessary. The amplicons are labeled with CRISPR, purified and imaged with AFM.

Exemplary Statistical Analysis of Labeling Rate

The full length of the molecule and the distance from one end of the molecule to the label of focus, were used to bisect the molecule into a shorter and a longer segment. The proportion of the full length represented by the segment of interest can be the target sequence. The theoretical expected value of proportion can also be determined with using expected measurements of full length and site location.

For each set of data, the distribution of these proportions, denoted p, around this value can vary as a function of image quality, deposition procedure and measurement errors as calculated by the Matlab analysis program. Proportions can be bounded by 0 and 1, and can often be analyzed by transforming them into logit form (see, e.g., Reference 27) defined as, for example:

$$logit = \ln\left(\frac{p}{1-p}\right) \quad (1)$$

The logit can be the natural log of the long segment proportion divided by the proportion's complement (e.g., one minus the proportion). This exemplary transformation can facilitate traditional linearized distribution statistics including means, standard deviations and confidence intervals based on the logits. The means and the lower and upper limits of the logit scale confidence intervals can then be back-transformed through exponentiation using, for example:

$$\hat{p} = \frac{e^{logit}}{1 + e^{logit}} \quad (2)$$

Figure 9:
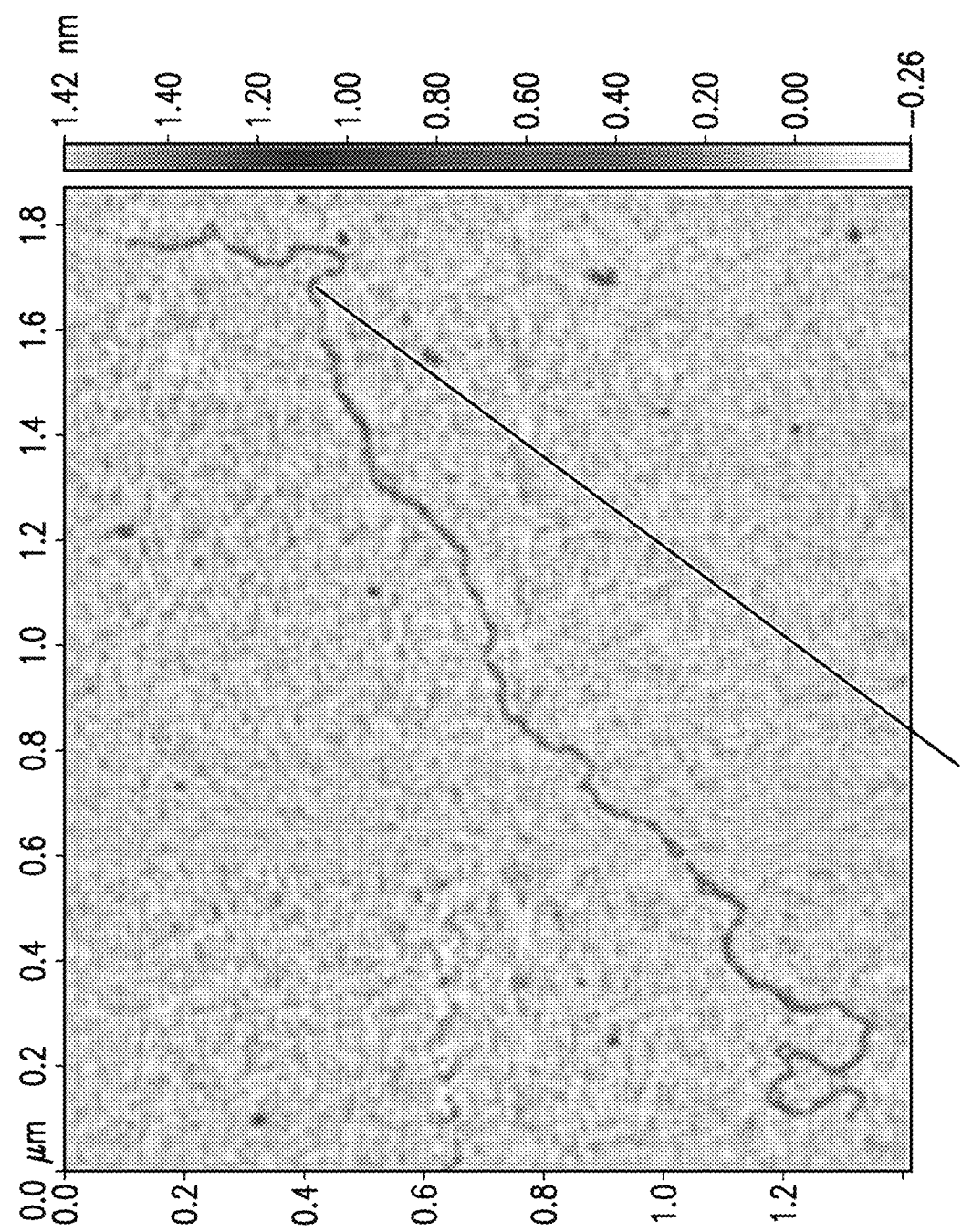
FIG. 9 is an exemplary image of a Cas9-labeled BRCA1 amplicon according to an exemplary embodiment of the present disclosure.
Figure 10:
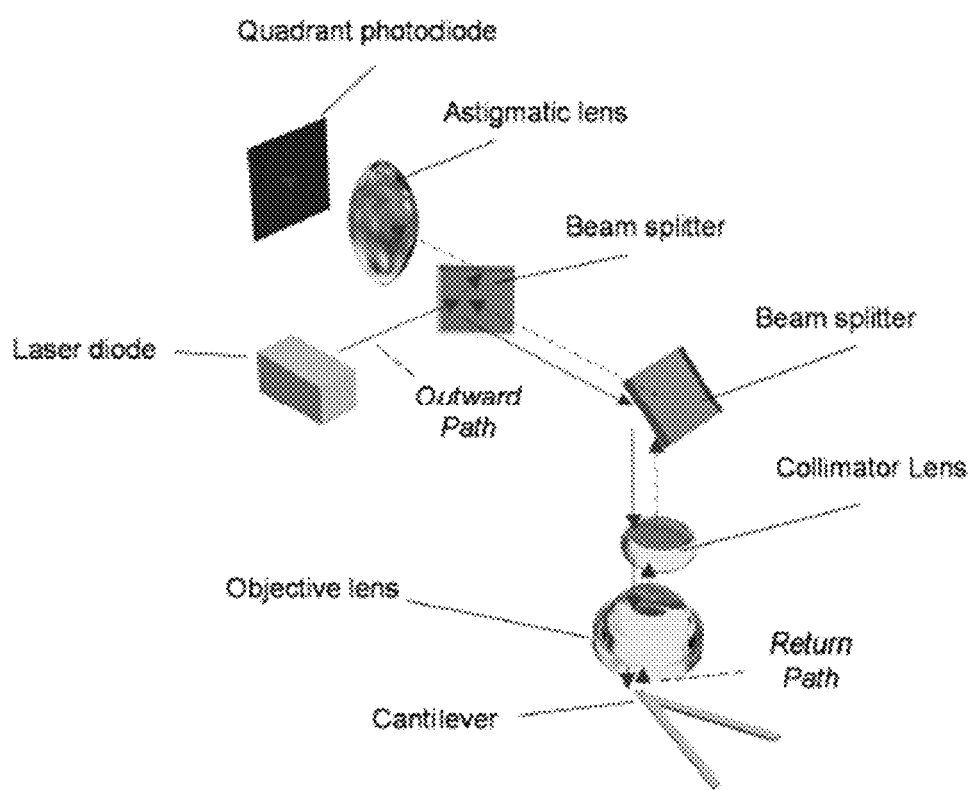
FIG. 10 is an exemplary diagram of the optical elements in the DVD optical pickup unit according to an exemplary embodiment of the present disclosure.

The percent of outliers for the 95% confidence interval of each label site are shown in Table 4 below. Additionally, an exemplary image of a Cas9-labeled BRCA1 amplicon is shown in FIG. 9. Cas9 labels are shown by element 905 on the DNA backbone. Images larger than 2 um×2 um are composed of 2 or more single frames.

TABLE 4

BRCA1 amplicon measurement detail. The nm-to-bp conversion assumes the solution value for DNA pitch (2.94 bp/nm).

BRCA1

| Fragment | Actual bp | Measured nm* | σ nm | μ calc bp | σ calc bp | Err bp | Abs err bp | CI95% bp | N |
|---|---|---|---|---|---|---|---|---|---|
| A | 1,764 | 601.4 | 49.2 | 1,768.7 | 115.2 | 4.7 | 4.7 | 100.9 | 5 |
| B | 4,632 | 1,581.1 | 15.1 | 4,650.4 | 207.4 | 18.4 | 18.4 | 181.8 | 5 |
| C | 313 | 109.0 | 29.6 | 320.6 | 27.7 | 7.6 | 7.6 | 18.1 | 9 |
| D | 2,285 | 813.9 | 9.4 | 2,393.9 | 87.1 | 108.9 | 108.9 | 60.4 | 8 |
| E | 1,116 | 400.5 | 70.5 | 1,177.8 | 44.4 | 61.8 | 61.8 | 32.9 | 7 |
| F | 2,781 | 971.6 | 39.2 | 2,857.7 | 144.8 | 76.7 | 76.7 | 100.3 | 8 |
| Median | 2,025 | | | | 101.1 | | 40.1 | N total | 42 |
| High | 4,632 | | | | 207.4 | | 108.9 | | |
| Low | 313 | | | | 27.7 | | 4.7 | | |
| DNA pitch | 2.94 | bp/nm | (assumed) | | | | | | |

*Lengths correspond to segments A-F between Cas9 labels (see e.g., FIG. 8).

TABLE 5

TERT & HER2 amplicon measurement detail. The nm-to-bp conversion was determined using independent reference molecules to find DNA pitch (lower table).

TERT & HER2

| Amplicon | Actual bp | Measured nm* | σ nm | μ calc bp | σ calc bp | Err bp | Abs err bp | CI95% bp | N |
|---|---|---|---|---|---|---|---|---|---|
| TERT L1 | 275 | 86.0 | 12.3 | 271.7 | 38.8 | (3.3) | 3.3 | 3.5 | 481 |
| TERT L2 | 420 | 133.4 | 13.2 | 420.5 | 41.5 | 0.5 | 0.5 | 3.8 | 460 |
| HER2 L1 | 164 | 54.3 | 8.7 | 172.0 | 27.5 | 8.0 | 8.0 | 2.5 | 462 |
| HER2 L3 | 451 | 144.0 | 17.6 | 453.9 | 55.5 | 2.9 | 2.9 | 5.1 | 450 |
| HER2 L4 | 521 | 163.8 | 17.2 | 516.0 | 54.3 | (5.0) | 5.0 | 4.9 | 474 |
| TERT L1L2, L1 | 275 | 87.3 | 9.0 | 275.6 | 28.5 | 0.6 | 0.6 | 2.8 | 408 |
| TERT L1L2, L2 | 420 | 135.5 | 11.9 | 427.2 | 37.4 | 7.2 | 7.2 | 3.6 | 408 |
| HER2 L1L2, L1 | 164 | 54.1 | 9.3 | 171.3 | 29.4 | 7.3 | 7.3 | 2.9 | 404 |
| HER2 L1L2, L2 | 335 | 106.0 | 10.6 | 334.5 | 33.4 | (0.5) | 0.5 | 3.3 | 404 |
| HER2 L1L3, L1 | 164 | 53.5 | 8.7 | 169.6 | 27.4 | 5.6 | 5.6 | 2.6 | 432 |
| HER2 L1L4, L4 | 521 | 166.2 | 16.7 | 523.5 | 52.7 | 2.5 | 2.5 | 5.0 | 432 |
| Median | 335 | | | | 37.4 | | 3.3 | N total | 4,815 |
| High | 521 | | | | 55.5 | | 8.0 | | |
| Low | 164 | | | | 27.4 | | 0.5 | | |

| Amplicon | Actual bp | Measured nm* | σ nm | N |
|---|---|---|---|---|
| HER2 L1L2, L1 | 164 | 51.6 | 9.3 | 440 |
| HER2 L2 | 335 | 110.0 | 10.2 | 411 |
| HER2 L1L3, L3 | 451 | 142.1 | 16.3 | 411 |
| Linear fit | | | N total | 1,262 |
| DNA pitch | | 3.14 bp/nm | | |
| Intercept | | −1.47 bp | | |

*Lengths to Cas9 labels measured from the DNA 5' end.

TABLE 6

Ladder measurement detail. The nm-to-bp conversion was determined using independent reference molecules to find DNA pitch (lower table).

Ladder - Calibrated

| Amplicon | Actual bp | Measured nm* | σ nm | μ calc bp | σ calc bp | Err bp | Abs err bp | CI95% bp | N |
|---|---|---|---|---|---|---|---|---|---|
| L100 | 100 | 34.2 | 4.2 | 99.5 | 12.2 | (0.5) | 0.5 | 1.0 | 589 |
| L100 | 100 | 34.0 | 4.3 | 99.0 | 12.4 | (1.0) | 1.0 | 0.9 | 760 |
| L100 | 100 | 33.9 | 3.6 | 98.8 | 10.6 | (1.2) | 1.2 | 0.7 | 820 |
| L150 | 150 | 51.1 | 5.5 | 150.8 | 16.4 | 0.8 | 0.8 | 0.5 | 4,470 |
| L150 | 150 | 51.6 | 6.7 | 152.3 | 19.9 | 2.3 | 2.3 | 0.6 | 4,092 |
| L150 | 150 | 51.7 | 5.3 | 152.5 | 15.8 | 2.5 | 2.5 | 0.5 | 3,346 |
| L150 | 150 | 51.4 | 6.6 | 151.7 | 19.6 | 1.7 | 1.7 | 0.6 | 4,286 |
| L150 | 150 | 51.0 | 6.3 | 150.5 | 18.7 | 0.5 | 0.5 | 0.6 | 4,359 |
| L150 | 150 | 51.3 | 6.3 | 151.2 | 18.5 | 1.2 | 1.2 | 0.5 | 4,367 |
| L200 | 200 | 66.9 | 8.4 | 198.7 | 24.9 | (1.3) | 1.3 | 1.4 | 1,284 |
| L200 | 200 | 67.8 | 6.5 | 201.3 | 19.3 | 1.3 | 1.3 | 0.7 | 2,630 |
| L200 | 200 | 66.9 | 7.1 | 198.5 | 21.2 | (1.5) | 1.5 | 1.0 | 1,643 |
| L250 | 250 | 84.2 | 9.9 | 251.1 | 29.6 | 1.1 | 1.1 | 0.9 | 3,899 |
| L250 | 250 | 83.3 | 7.4 | 248.3 | 22.2 | (1.7) | 1.7 | 0.9 | 2,148 |
| L250 | 250 | 84.8 | 9.0 | 252.9 | 26.8 | 2.9 | 2.9 | 1.9 | 736 |
| Median | 150 | | | | 19.6 | | 1.3 | N total | 38,080 |
| High | 250 | | | | 29.6 | | 2.9 | | |
| Low | 100 | | | | 10.6 | | 0.5 | | |

| Amplicon | Actual bp | Measured nm* | σ nm | N |
|---|---|---|---|---|
| L100 | 100 | 34.4 | 4.8 | 475 |
| L100 | 100 | 34.0 | 3.8 | 909 |
| L100 | 100 | 34.6 | 4.3 | 1,135 |
| L300 | 300 | 100.5 | 11.6 | 1,647 |
| L300 | 300 | 101.3 | 10.6 | 1,304 |
| L300 | 300 | 100.1 | 12.8 | 1,606 |
| L300 | 300 | 99.5 | 11.0 | 843 |
| Linear fit | | | N total | 7,919 |
| DNA pitch | 3.0 bp/nm | | | |
| Intercept | −4.0 bp | | | |

*Lengths measured between Cas9 labels.

Exemplary High-Speed AFM (HS-AFM)

The exemplary system, method, computer-accessible medium and apparatus according to an exemplary embodiment of the present disclosure can utilize a very low spring constant triangle cantilever (e.g., Bruker Nano, MSNL, 0.01-0.03 N/m spring constant) operating in contact mode with no z-feedback. Exemplary spring constants can vary around 0.03 N/m (e.g., between 0.03 N/m to 0.04 N/m.) The cantilever vertical deflection was measured by a 2.5 MHz bandwidth laser Doppler vibrometer (e.g., Polytec) using a height decoder module (see, e.g., Reference 28). The sample was translated in the fast (e.g., 1000 Hz) and slow (e.g., 4 Hz) scan directions by a piezo-actuated flexure stage capable of 3 um deflection in both axes. Images of size 2×2 um, 1000×1000 pixels were captured in raster mode and rendered using customized LabView software (see, e.g., Reference 29). The high-speed flexure stage was mounted on a stick-slip x-y positioner with less than 100 nm repeatability on both axes (e.g., Smaract, Inc.).

Exemplary AFM Data Processing/Analysis

An exemplary image-processing program called AFMExplorer was used to analyze images. AFM images can then be flattened and pre-filtered to reduce noise, followed by adaptive thresholding based on pixel height to recognize regions corresponding to DNA molecules; a binary skeletonization procedure can be used to determine the best backbone contour for each molecule, and the molecule length in nanometers can be calculated by a cubic spline fit to the backbone pixel set. The exemplary system, method, computer-accessible medium and approach can be used for obtaining an exemplary enzyme recognition. For example, the height change on the backbone of the molecule can be detected due to each CRISPR label and the length in nanometers of the distance from one end of the molecule to the label site can be calculated. In the case of more than one label the measurements can be continued to each additional site. Manual Queueing can be used to correct or ignore automation errors; otherwise the molecule identification and measurement can be fully automatic.

Figure 15A:
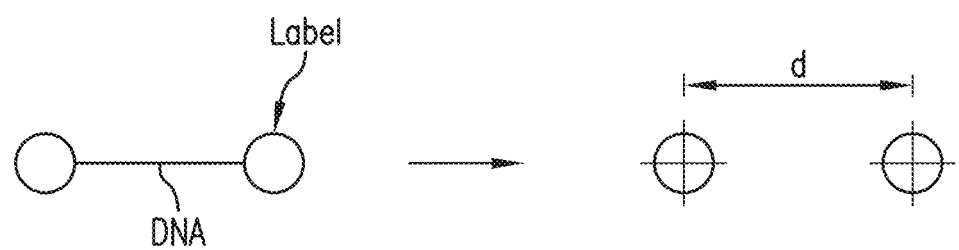
FIGS. 15A and 15B are exemplary diagrams of the exemplary data analysis performed by the exemplary system, method, computer accessible medium and apparatus according to an exemplary embodiment of the present disclosure.

Large numbers of identical molecule can be measured in order to obtain a precise average value for their length via determining the spacing between labels. In some exemplary cases, the center-to-center distance between labels can be determined, rather than the contour length of the molecule between labels. This method can be more tolerant of poor imaging conditions because it can be taller than the DNA backbone. The exemplary image processing can also be simpler in this exemplary case (see e.g., FIG. 15A).

Figure 15B:
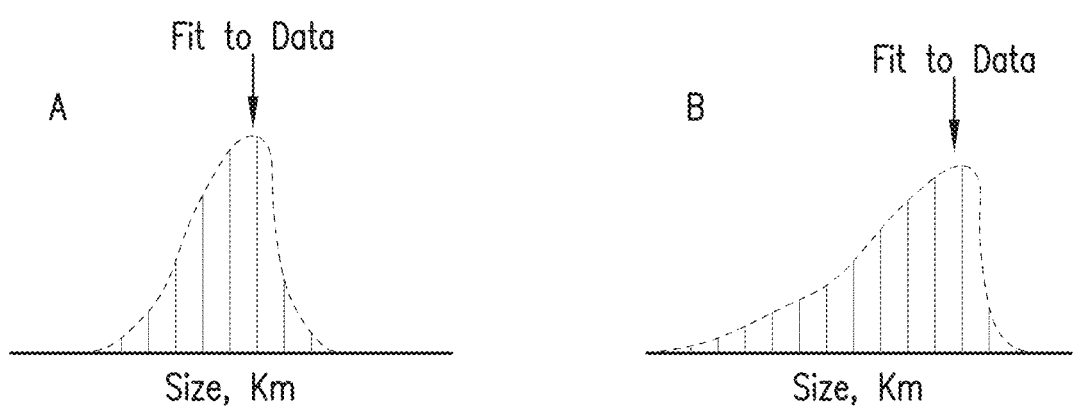

As shown in the diagrams of FIG. 15B, for lengths less than about 150 bp, the distribution of lengths measured from a homogenous population can be roughly symmetrical (see e.g., case A). For longer molecules, the distribution of lengths can become skewed (e.g., case B). An accurate method to estimate the population length can account for this skewed distribution (see e.g., FIG. 15B).

TABLE 7

Cas9 labeling efficiency. The labeling efficiency was then determined based on the
number of sites per molecule, as represented in the sixth column. Molecules not within +/−15%
of the expected length, using an assumed DNA pitch of 0.34 nm/bp, were excluded from analysis.
The percent of outliers represented in the last column was determined by the statistical procedure
found in the Methods.

| Amplicon(s) | Guide RNA(s) Site | Guide RNA Concentraton (final), nM | Type of CRISPR | Number of Molecules Analyzed | Labeling Efficiency | Percent of Outliers |
| --- | --- | --- | --- | --- | --- | --- |
| TERT L1 | 275 bp | 400 | WT Cas9 | 508 | 99% | 2% |
| TERT L2 | 420 bp | 400 | WT Cas9 | 505 | 94% | 5% |
| HER2 L1 | 164 bp | 400 | WT Cas9 | 501 | 96% | 6% |
| HER2 L2 | 335 bp | 400 | WT Cas9 | 504 | 94% | 3% |
| HER2 L3 | 451 bp | 400 | WT Cas9 | 505 | 91% | 8% |
| HER2 L4 | 498 bp | 400 | WT Cas9 | 506 | 98% | 6% |
| TERT L1 + L2 | 275 bp + 420 bp | 400 + 400 | WT Cas9 | 502 | 88% | 5% |
| HER2 L1 + L2 | 164 bp + 335 bp | 400 + 400 | WT Cas9 | 501 | 84% | 6% |
| HER2 L1 + L3 | 164 bp + 451 bp | 400 + 400 | WT Cas9 | 499 | 86% | 5% |
| HER2 L1 + L4 | 164 bp + 498 bp | 400 + 400 | WT Cas9 | 504 | 90% | 5% |
| HER2 L1 + L3 | 164 bp + 451 bp | 400 + 400 | Cas9 Nickase | 503 | 68% | 4% |
| HER2 L1 + L4 | 164 bp + 498 bp | 400 + 400 | Cas9 Nickase | 506 | 95% | 5% |

Figure 16:
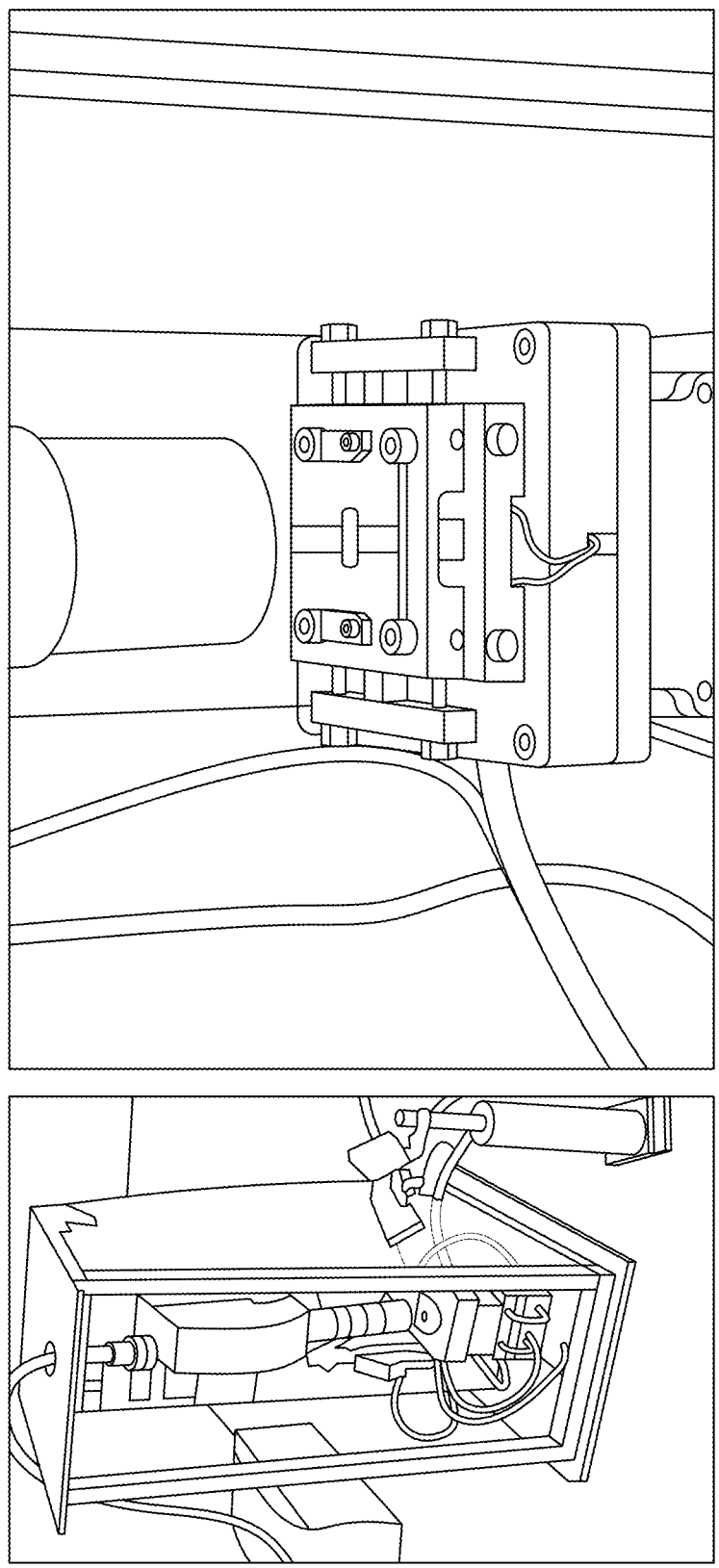
FIGS. 16 and 17 are exemplary images of the exemplary system, method, computer accessible medium and apparatus according to an exemplary embodiment of the present disclosure.
Figure 17:
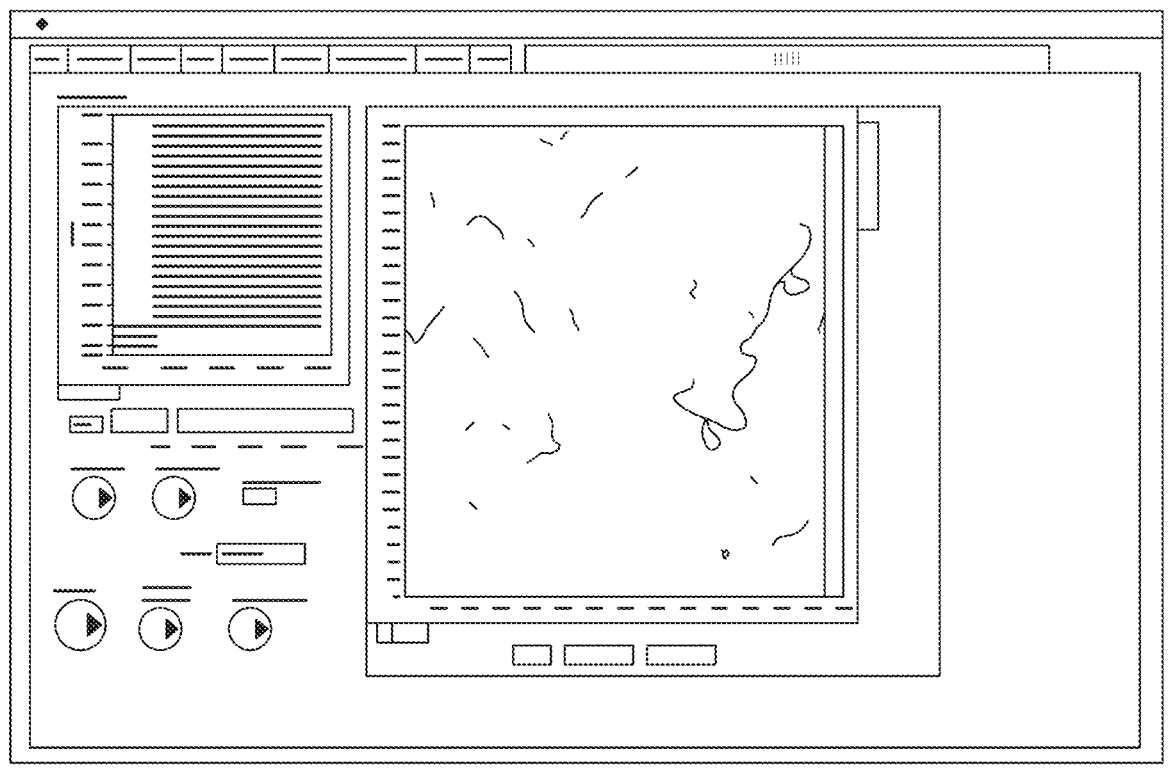

FIG. 16 shows a set of exemplary images of the exemplary high speed AFM device and FIG. 17 shows an exemplary image of the ex AFM device software interface, according to exemplary embodiments of the present disclosure.

FIGS. 18A-C show a set of graphs illustrating sizing and absolute precision and accuracy of the exemplary system, method, computer accessible medium and apparatus according to an exemplary embodiment of the present disclosure. FIG. 18A illustrates the measured vs. actual size. FIG. 18B illustrates the standard deviation of repeated measurements as a function of molecule size or marker spacing. FIG. 18C illustrates an estimation of insertion or deletion size detected at each 95% confidence for a given imaging time.

Figure 19:
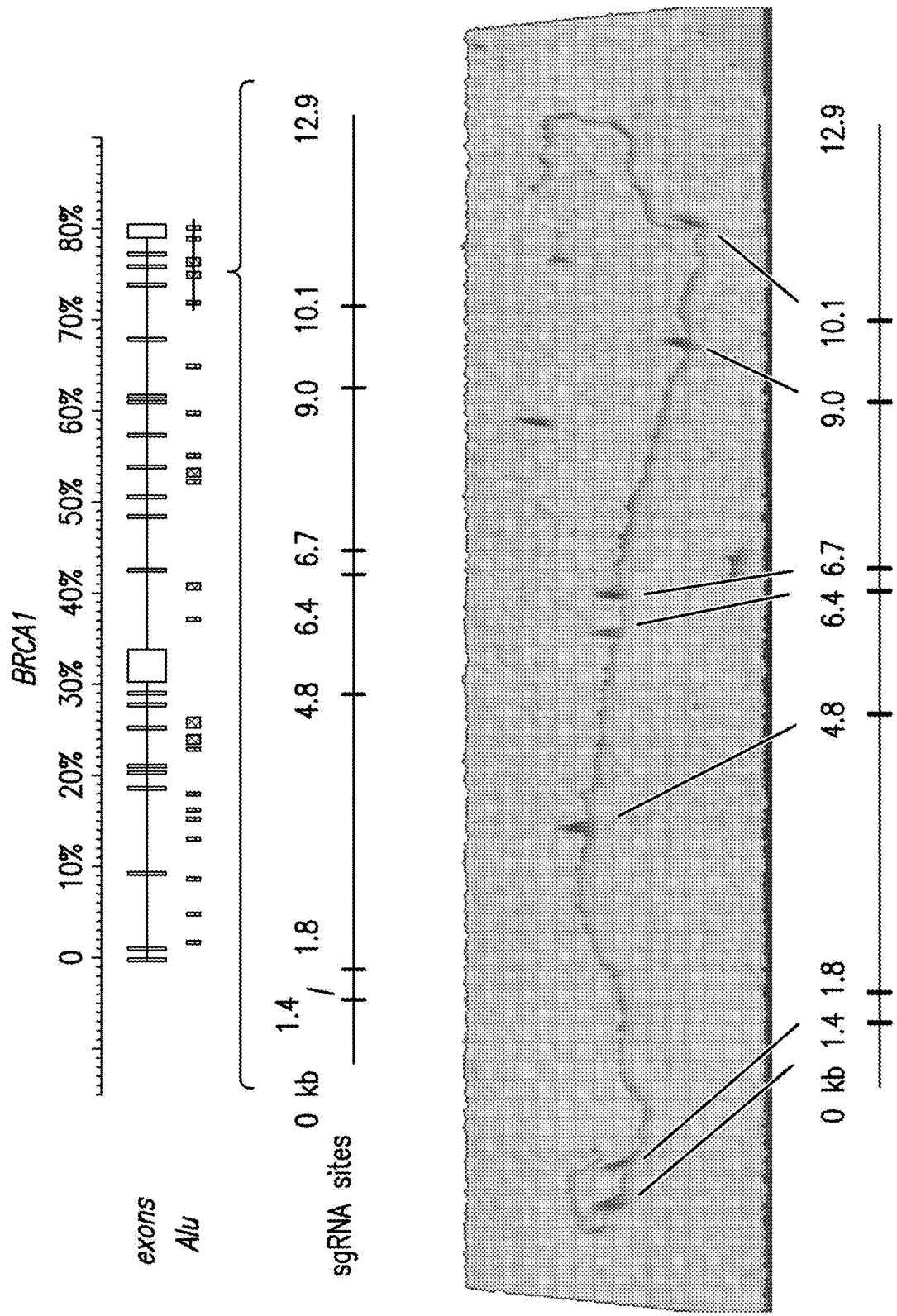
FIG. 19 is an exemplary diagram illustrating the location of BRCA1 long-PCR amplicon with respect to the BRCA1 genomic locus according to an exemplary embodiment of the present disclosure.

FIG. 19 shows an exemplary diagram illustrating the location of BRCA1 long-PCR amplicon with respect to the BRCA1 genomic locus according to an exemplary embodiment of the present disclosure. The location of BRCA1 long-PCR amplicon with respect to the BRCA1 genomic locus can be seen (e.g., as indicated by Alu sites which can be labeled with CRISPR sgRNA).

Figure 20:
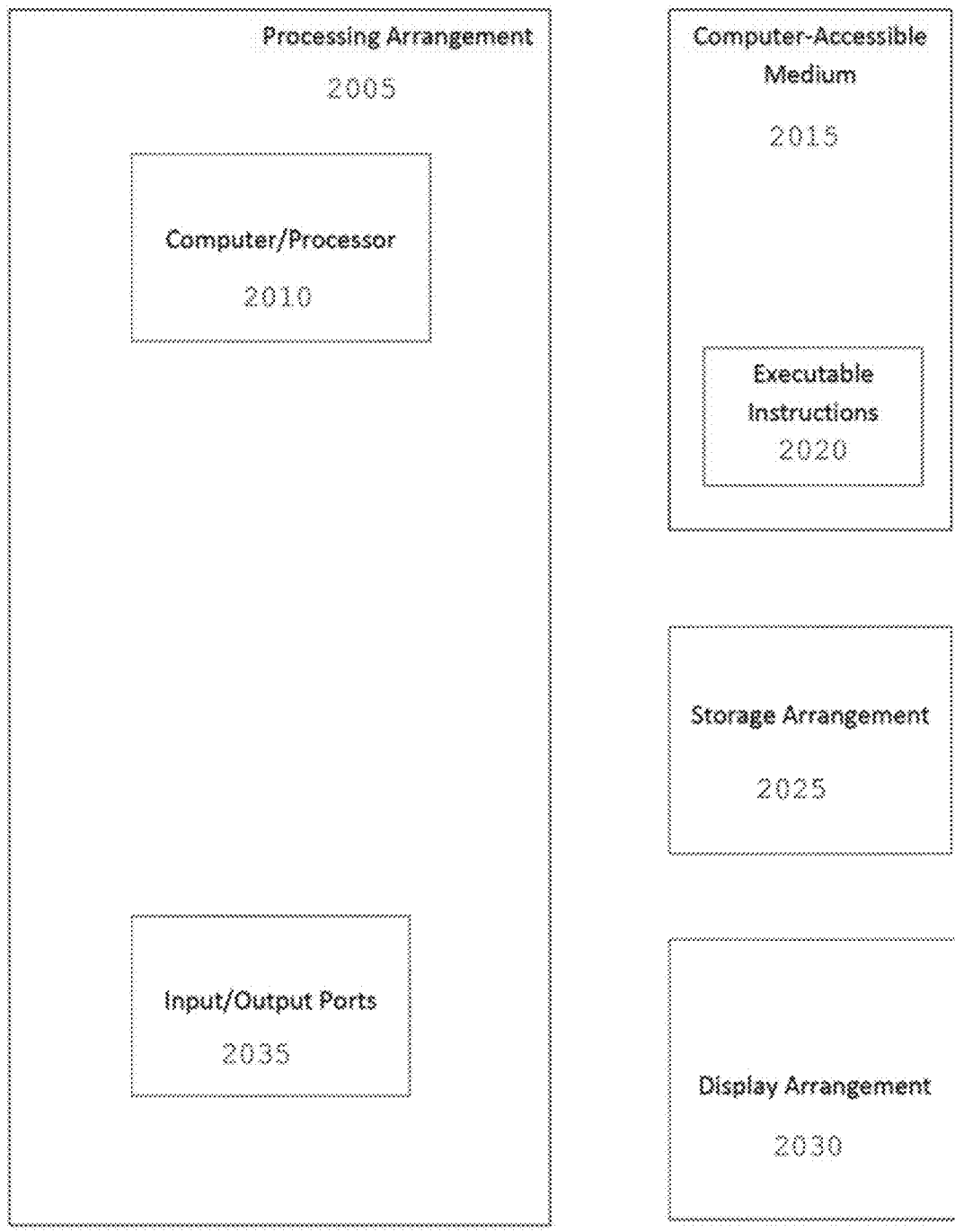
FIG. 20 is an illustration of an exemplary block diagram of an exemplary system in accordance with certain exemplary embodiments of the present disclosure.

FIG. 20 shows a block diagram of an exemplary embodiment of a system according to the present disclosure. For example, exemplary procedures in accordance with the present disclosure described herein can be performed by a processing arrangement and/or a computing arrangement 2005. Such processing/computing arrangement 2005 can be, for example entirely or a part of, or include, but not limited to, a computer/processor 2010 that can include, for example one or more microprocessors, and use instructions stored on a computer-accessible medium (e.g., RAM, ROM, hard drive, or other storage device).

As shown in FIG. 20, for example a computer-accessible medium 2015 (e.g., as described herein above, a storage device such as a hard disk, floppy disk, memory stick, CD-ROM, RAM, ROM, etc., or a collection thereof) can be provided (e.g., in communication with the processing arrangement 2005). The computer-accessible medium 2015 can contain executable instructions 2020 thereon. In addition or alternatively, a storage arrangement 2025 can be provided separately from the computer-accessible medium 2015, which can provide the instructions to the processing arrangement 2005 so as to configure the processing arrangement to execute certain exemplary procedures, processes and methods, as described herein above, for example.

Further, the exemplary processing arrangement 2005 can be provided with or include an input/output arrangement 2035, which can include, for example a wired network, a wireless network, the internet, an intranet, a data collection probe, a sensor, etc. As shown in FIG. 20, the exemplary processing arrangement 2005 can be in communication with an exemplary display arrangement 2030, which, according to certain exemplary embodiments of the present disclosure, can be a touch-screen configured for inputting information to the processing arrangement in addition to outputting information from the processing arrangement, for example. Further, the exemplary display 2030 and/or a storage arrangement 2025 can be used to display and/or store data in a user-accessible format and/or user-readable format.

Exemplary Application of DNA "Nanomapping" Using CRISPR-Cas9 as a Programmable Nanoparticle Introduction. Described herein are two substantial technical advances in DNA nanotechnology and single molecule genomics: (1) a labeling technique (CRISPR-Cas9 nanoparticles) for high-speed AFM-based physical mapping of DNA and, (2) the use of DVD optics to image DNA molecules with high-speed AFM. As proof of principle, we used this new 'nanomapping' method to detect and map precisely BCL2-IGH translocations present in lymph node biopsies of follicular lymphoma patents. This HS-AFM 'nanomapping' technique can be complementary to both sequencing and other physical mapping approaches.

In this study, HS-AFM was used to create precise DNA single molecule physical maps, and show scalability by integrating consumer electronics (DVD optical pickup units). To date the impetus behind the field of high-speed AFM development has been the visualization and study of biomolecular processes. The instruments designed to achieve this goal all sacrifice sample versatility to provide a small (e.g., 1×1 µm) window into the nanoscale. The lack of scalability of these measurements prohibits their use in physical mapping, which requires both high data rates and wide area coverage. In contrast, the present method for high-speed AFM addresses directly this need. It follows design principles distinct from the rest of the field: operating in a high-speed contact mode, bandwidth bottlenecks are avoided and unprecedented rates of nanoscale measurements are enabled.

To unlock the potential of HS-AFM-based 'nanomapping', a new use of Cas9 as a stable and specific "programmable nanoparticle" was developed. One very significant discovery described herein is the relative stability of the Cas9-sgRNA-DNA complex in the face of the harsh perturbation generated by the AFM tip moving at linear speeds of up to 10 millimeters per second. Previous work on DNA labeling with CRISPR-Cas9 has focused on its properties and uses as an enzyme, which is very different from the present use of it as a 'nanoparticle'. Molecule fragmentation is a major drawback of nicking-based labeling schemes. DNA with closely spaced nicks (e.g., <~200 bp) is not stable, and will not remain intact during processing. This problem impairs precisely locating translocation breakpoints, or localizing short insertions or deletions. It also puts an upper bound on the maximum length of the molecule, because very long molecules will inevitably contain two nearby nicking sites. Using Cas9 as a nanoparticle instead of a nicking enzyme avoids these drawbacks.

BCL2-IGH translocation mapping. An important application of 'nanomapping' as described herein is detecting cancer-related structural variants of diagnostic and prognostic significance. In the clinical lab, fluorescent in situ hybridization (FISH) and PCR remain the mainstays; unfortunately, they fail in a significant fraction of cases, due either to insufficient resolution (FISH) or the fact that the vast majority of structural variant breakpoints are scattered widely and thus cannot be localized a priori for amplification by PCR. While microarrays can improve the detection of copy number variations, they are not a replacement for FISH, for example, because they cannot detect un-localized balanced translocations.

Figure 21A:
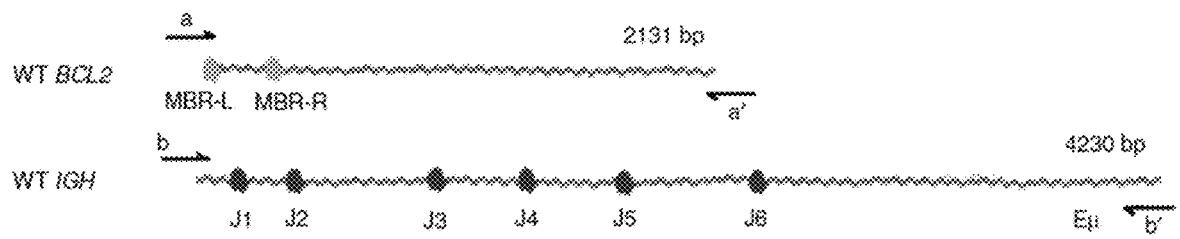
FIGS. 21A, 21B, and 21C are maps and HSAFM images of amplicons according to an exemplary embodiment of the present disclosure.
Figure 21B:
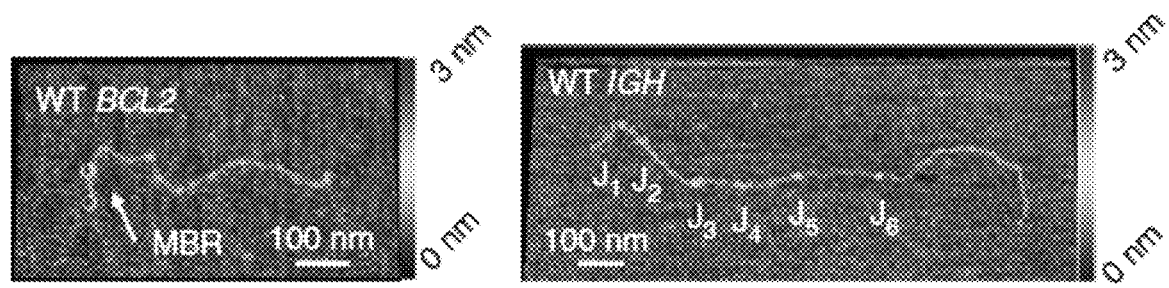
Figure 21C:
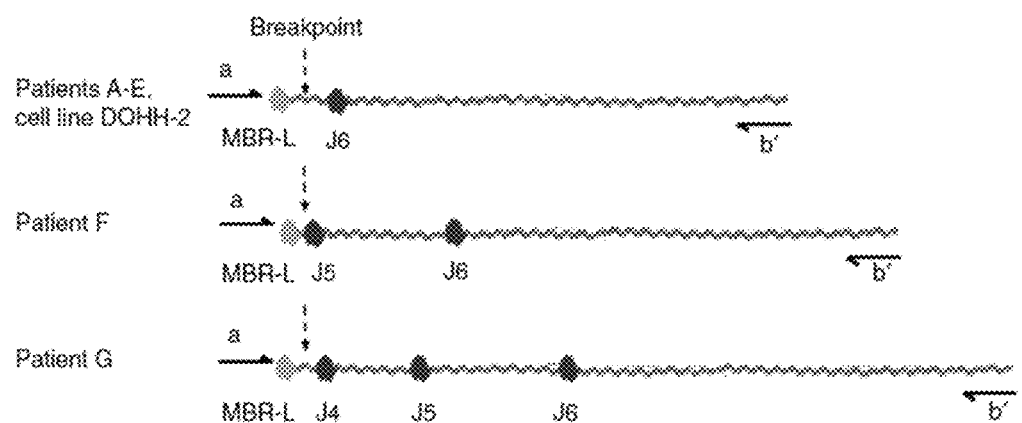

As shown in FIG. 21A-C, the feasibility of using Cas9-HSAFM mapping to detect the BCL2-IGH translocation associated with follicular lymphoma caused by aberrant V(D)J recombination was assessed. The breakpoints for this translocation are well characterized and serve as a reference for validating the accuracy and reproducibility of results using this technique in clinical samples, such as bone marrow and lymph node biopsies. These breakpoints occur adjacent to the Ig heavy chain J-region ($J_H$) or adjacent to the junction of the heavy chain D-region and J-Region ($D_H J_H$). The majority of the corresponding breakpoints in BCL2 (e.g., about 60% of cases) occurring in a hotspot known as the Major Breakpoint Region (MBR), making this region a convenient target for these tests.

sgRNAs targeting the $J_H$ elements in IGH and the MBR region of BCL2 were designed. FIG. 21A shows the labeling scheme and corresponding images of wild type BCL2 and un-rearranged IGH obtained from human germ line DNA. Using the Cas9 labels, a known BCL2-IGH translocation present in the follicular lymphoma cell line DOHH-2 was mapped and similar translocations in seven lymph node tissue samples from follicular lymphoma patients were detected (FIG. 21C). In doing so, we employed very closely spaced markers (tens of nanometers) that are well distinguished—a capability beyond what is possible with any form of optical mapping, including super-resolution optical methods.

Exemplary Single Molecule Approach for Detecting Cryptic Translocations in Hematologic Malignancies Clinical Validation of the AFM translocation assay. Multiple Myeloma is characterized by translocations involving the IgH locus on chromosome 14q32, involving a number of partners including CCND1, FGFR3, c-MAF (see reference 31). These have been reported in frequencies of ~15-20%, 15% and 2-6% respectively (see references 32 and 33). In addition to diagnostic value these translocations have prognostic significance as well. This study will validate the ability of the AFM translocation assay to accurately identify these translocations and to be able to follow them prospectively in patients. Patients with myeloma when they undergo diagnostic biopsies, will have an aliquot of the marrow aspirate sample submitted for multiplex AFM assay for chromosome 14q32 and its translocation partners. The patients will also undergo standard testing, specifically FISH and cytogenetics. FISH will be performed using a standardized set of MM specific probes. Following initial therapy, the patients with identified translocations will undergo repeat testing at each of the following time points: pre transplant, post-transplant day 60-90, six months, and at one year to identify evidence of minimal residual disease.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

EXEMPLARY REFERENCES

The following references are hereby incorporated by reference in their entireties:

1. Kwong, A. et al. The importance of analysis of long-range rearrangement of BRCA1 and BRCA2 in genetic diagnosis of familial breast cancer. *Cancer Genet-Ny* 208, 448-454 (2015).
2. Judkins, T. et al. Clinical significance of large rearrangements in BRCA1 and BRCA2. *Cancer-Am Cancer Soc* 118, 5210-5216 (2012).
3. Seong, M. W. et al. A multi-institutional study of the prevalence of BRCA1 and BRCA2 large genomic rearrangements in familial breast cancer patients. *Bmc Cancer* 14 (2014).
4. Gad, S. et al. Identification of a large rearrangement of the BRCA1 gene using colour bar code on combed DNA in an American breast/ovarian cancer family previously studied by direct sequencing. *J Med Genet* 38, 388-392 (2001).
5. Welcsh, P. L. & King, M. C. BRCA1 and BRCA2 and the genetics of breast and ovarian cancer. *Hum Mol Genet* 10, 705-713 (2001).
6. Jing, J. P. et al. Automated high resolution optical mapping using arrayed, fluid-fixed DNA molecules. *Proceedings of the National Academy of Sciences of the United States of America* 95, 8046-8051 (1998).
7. Lai, Z. W. et al. A shotgun optical map of the entire Plasmodium falciparum genome. *Nature Genetics* 23, 309-313 (1999).
8. Das, S. K. et al. Single molecule linear analysis of DNA in nano-channel labeled with sequence specific fluorescent probes. *Nucleic Acids Research* 38 (2010).
9. Baday, M. et al. Multicolor Super-Resolution DNA Imaging for Genetic Analysis. *Nano Lett* 12, 3861-3866 (2012).
10. Vranken, C. et al. Super-resolution optical DNA Mapping via DNA methyltransferase-directed click chemistry. *Nucleic Acids Res* 42, e50 (2014).
11. Anantharaman, T. S., Mysore, V. & Mishra, B. Fast and cheap genome wide haplotype construction via optical mapping. (2005).
12. Reed, J. et al. Identifying individual DNA species in a complex mixture by precisely measuring the spacing between nicking restriction enzymes with atomic force microscope. *J R Soc Interface* 9, 2341-2350 (2012).
13. Levy-S akin, M. & Ebenstein, Y. Beyond sequencing: optical mapping of DNA in the age of nanotechnology and nanoscopy. *Curr Opin Biotechnol* 24, 690-698 (2013).
14. Neely, R. K. et al. DNA fluorocode: A single molecule, optical map of DNA with nanometre resolution. *Chem Sci* 1, 453-460 (2010).
15. McCaffrey, J. et al. CRISPR-CAS9 D10A nickase target-specific fluorescent labeling of double strand DNA for whole genome mapping and structural variation analysis. *Nucleic Acids Res* 44, e11 (2016).
16. O'Connell, M. R. et al. Programmable RNA recognition and cleavage by CRISPR/Cas9. *Nature* 516, 263-+ (2014).
17. Abudayyeh, O. O. et al. C2c2 is a single-component programmable RNA-guided RNA-targeting CRISPR effector. *Science* 353, aaf5573 (2016).
18. De Brakeleer, S., De Greve, J., Lissens, W. & Teugels, E. Systematic Detection of Pathogenic Alu Element Insertions in NGS-Based Diagnostic Screens: The BRCA1/BRCA2 Example. *Hum Mutat* 34, 785-791 (2013).
19. Puget, N. et al. A 1-kb Alu-mediated germ-line deletion removing BRCA1 exon 17. *Cancer Res* 57, 828-831 (1997).
20. Petrij-Bosch, A. et al. BRCA1 genomic deletions are major founder mutations in Dutch breast cancer patients. *Nat Genet* 17, 341-345 (1997).
21. Quercioli, F., Tiribilli, B., Ascoli, C., Baschieri, P. & Frediani, C. Monitoring of an atomic force microscope cantilever with a compact disk pickup. *Review of Scientific Instruments* 70, 3620-3624 (1999).
22. Hwu, E. T., Huang, K. Y., Hung, S. K. & Hwang, I. S. Measurement of cantilever displacement using a compact disk/digital versatile disk pickup head. *Japanese Journal of Applied Physics Part 1-Regular Papers Brief Communications & Review Papers* 45, 2368-2371 (2006).
23. Hwu, E. T. et al. Anti-drift and auto-alignment mechanism for an astigmatic atomic force microscope system based on a digital versatile disk optical head. *Review of Scientific Instruments* 83 (2012).
24. Jia, H., Guo, Y., Zhao, W. & Wang, K. Long-range PCR in next-generation sequencing: comparison of six enzymes and evaluation on the MiSeq sequencer. *Sci Rep* 4, 5737 (2014).
25. Reed, J. et al. Identifying individual DNA species in a complex mixture by precisely measuring the spacing between nicking restriction enzymes with atomic force microscope. *J R Soc Interface* 9, 2341-2350 (2012).
26. Mikheikin, A. et al. High-Speed Atomic Force Microscopy Revealing Contamination in DNA Purification Systems. *Anal Chem* 88, 2527-2532 (2016).
27. Warton, D. I. & Hui, F. K. C. The arcsine is asinine: the analysis of proportions in ecology. *Ecology* 92, 3-10 (2011).
28. Payton, O. D., Picco, L., Miles, M. J., Homer, M. E. & Champneys, A. R. Improving the signal-to-noise ratio of high-speed contact mode atomic force microscopy. *Rev Sci Instrum* 83 (2012).
29. Klapetek, P. et al. Large area high-speed metrology SPM system. *Nanotechnology* 26 (2015).
30. Sundstrom, A. et al. Image Analysis and Length Estimation of Biomolecules Using AFM. *Ieee T Inf Technol B* 16, 1200-1207 (2012).
31. Inagaki A, Tajima E, Uranishi M, Totani H, Asao Y, Ogura H, Masaki A, Yoshida T, Mori F, Ito A, Yano H, Ri M, Kayukawa S, Kataoka T, Kusumoto S, Ishida T, Hayami Y, Hanamura I, Komatsu H, Inagaki H, Matsuda Y, Ueda R, Iida S. Global real-time quantitative reverse transcription-polymerase chain reaction detecting pro to-oncogenes associated with 14q32 chromosomal translocation as a valuable marker for predicting survival in multiple myeloma. Leuk Res. 2013 December; 37(12): 1648-55.
32. Herve A L, Florence M, Philippe M, Michel A, Thierry F, Kenneth A, Jean-Luc H, Nikhil M, Stephane M. Molecular heterogeneity of multiple myeloma: pathogenesis, prognosis, and therapeutic implications. J Clin Oncol. 2011 May 10; 29(14):1893-7.
33. Sawyer J R. The prognostic significance of cytogenetics and molecular profiling in multiple myeloma. Cancer Genet. 2011 January; 204(1):3-12.

The invention claimed is:

1. A method of mapping nucleotide molecules, comprising:
    incubating a target nucleotide in a magnesium-free mixture, wherein the magnesium-free mixture comprises a Clustered Regularly Interspaced Short Palindromic Repeats (CRISPR)-cellular apoptosis susceptibility (Cas) protein and a guide ribonucleic acid (RNA), and wherein incubating the target nucleotide with the CRISPR-Cas protein binds the CRISPR-Cas protein to the target nucleotide to form a CRISPR-Cas/target nucleotide complex without the CRISPR-Cas protein cleaving the target nucleotide;
    depositing the CRISPR-Cas/target nucleotide complex on a flat surface, wherein after deposition the CRISPR-Cas/target nucleotide complex is bound to the flat surface; and imaging the CRISPR-Cas/target nucleotide complex on the flat surface by using high-speed atomic force microscopy (AFM) operating in contact mode, wherein the high speed AFM has a probe linear speed of 4 to 10 millimeters per second, wherein the high-speed atomic force microscopy comprises an AFM system which comprises: at least one cantilever; at least one scanning probe arrangement including a laser positioned over a portion of the at least one cantilever which contacts a surface of at least one sample, wherein a tilt angle of the at least one cantilever with respect to the at least one scanning probe arrangement is less than 10 degrees; and a power source configured to generate a displacement noise that is less than 300 Picometers.

2. The method of claim 1, wherein the target nucleotide is deoxyribonucleic acid (DNA).

3. The method of claim 2, wherein the DNA is a polymerase chain reaction (PCR) amplicon.

4. The method of claim 2, wherein the DNA is genomic DNA.

5. The method of claim 1, wherein the target nucleotide is a DNA/RNA hybrid.

6. The method of claim 1, wherein the magnesium-free mixture includes EDTA, wherein the EDTA chelates any magnesium in the mixture to render the mixture magnesium-free.

7. The method of claim 1, wherein the magnesium-free mixture is a magnesium-free deposition buffer that comprises magnesium-alternates selected from the group consisting of zinc and nickel.

8. The method of claim 1, wherein the CRISPR-Cas protein is Cas9.

9. The method of claim 1, wherein the CRISPR-Cas protein is a modified Cas9.

10. The method of claim 1, wherein the guide RNA is an sgRNA.

11. The method of claim 1, wherein at least two or more guide RNA targeting different nucleotide sequences are present in the mixture.

12. The method of claim 1, wherein before depositing the CRISPR-Cas/target nucleotide complex on a flat surface, any unbound CRISPR-Cas protein or guide RNA is removed.

13. The method of claim 12, wherein the unbound CRISPR-Cas protein or guide RNA is removed with a magnetic bead-based purification system.

14. The method of claim 1, wherein after depositing the CRISPR-Cas/target nucleotide complex on a flat surface, any unbound CRISPR-Cas protein or guide RNA is removed.

15. The method of claim 1, wherein the flat surface is a mica surface.

16. The method of claim 1, wherein the flat surface is a transparent surface.

17. The method of claim 1, further comprising a step of using an image obtained from the imaging step for de novo mapping of the target nucleotide.

18. The method of claim 1, further comprising a step of using an image obtained from the imaging step for quantitating the amount of the target nucleotide.

19. The method of claim 1, further comprising a step of fixing the CRISPR-Cas protein to the target nucleotide after said incubating step.

20. The method of claim 1, wherein the at least one scanning probe arrangement has a detection bandwidth of at least 80 MHZ.

21. The method of claim 1, wherein the high-speed AFM further comprises at least one digitizing arrangement associated with the at least one scanning probe arrangement and wherein the at least one digitizing arrangement has a bandwidth of about 2 MHZ.

22. The method of claim 1, wherein the at least one cantilever has a spring constant of 0.01 to 0.03 newton meters.

23. The method of claim 1, wherein a cantilever deflection signal is captured at a rate of at least 2 million samples per second in the imaging step.

24. The method of claim 1, wherein the high-speed AFM has a frame rate of 0.5 to 1 frames per second in the imaging step.

25. The method of claim 1, wherein the laser is positioned directly above the at least one cantilever.

26. A method of mapping nucleotide molecules, comprising:
    incubating a double-stranded deoxyribonucleic acid (dsDNA) molecule in a magnesium-free mixture, wherein the magnesium-free mixture comprises a CRISPR-Cas9 protein and an sgRNA, and wherein incubating the dsDNA molecule with the CRISPR-Cas9 protein binds the CRISPR-Cas9 protein to the dsDNA molecule to form a CRISPR-Cas9/dsDNA complex without the CRISPR-Cas9 protein cleaving the dsDNA molecule;
    fixing the CRISPR-Cas9/dsDNA complex by adding formaldehyde to the mixture;
    depositing the CRISPR-Cas9/dsDNA complex on a mica surface, wherein after the deposition the CRISPR-Cas9/dsDNA complex is bound to the mica surface; and
    imaging the CRISPR-Cas9/dsDNA complex on the mica surface by using high-speed AFM operating in contact mode, wherein the high speed AFM has a probe linear speed of 4 to 10 millimeters per second, wherein before imaging any unbound CRISPR-Cas9 protein or sgRNA is removed;
wherein the high-speed AFM comprises:
    an AFM system, comprising:
        at least one cantilever;
        at least one scanning probe arrangement including a laser positioned over a portion of the at least one cantilever which contacts a surface of at least one sample, wherein a tilt angle of the at least one cantilever with respect to the at least one scanning probe arrangement is less than 10 degrees; and
        a power source configured to generate a displacement noise that is less than 300 Picometers.

* * * * *